United States Patent
Jia et al.

(10) Patent No.: US 10,910,824 B1
(45) Date of Patent: Feb. 2, 2021

(54) ACTIVE CONTROL-BASED PROTECTION SYSTEM AND METHOD FOR FLEXIBLE DIRECT CURRENT SYSTEM OF PHOTOVOLTAIC PLANT

(71) Applicant: NORTH CHINA ELECTRIC POWER UNIVERSITY, Beijing (CN)

(72) Inventors: Ke Jia, Beijing (CN); Tianshu Bi, Beijing (CN); Rui Zhu, Beijing (CN)

(73) Assignee: North China Electric Power University, Beijing (CN)

(*) Notice: Subject to any disclaimer, the term of this patent is extended or adjusted under 35 U.S.C. 154(b) by 0 days.

(21) Appl. No.: 16/936,074

(22) Filed: Jul. 22, 2020

(51) Int. Cl.
*H02H 7/20* (2006.01)
*H02M 3/33* (2006.01)
*H02H 1/00* (2006.01)
*H02M 3/335* (2006.01)

(52) U.S. Cl.
CPC ............ *H02H 7/20* (2013.01); *H02H 1/0007* (2013.01); *H02M 3/3353* (2013.01)

(58) Field of Classification Search
CPC ...... H02H 7/20; H02H 1/0007; H02M 3/3353
See application file for complete search history.

(56) References Cited

U.S. PATENT DOCUMENTS

| | | | |
|---|---|---|---|
| 9,897,642 B1* | 2/2018 | Johnson | H02S 40/30 |
| 2010/0308662 A1* | 12/2010 | Schatz | H02J 3/385 |
| | | | 307/80 |
| 2012/0113554 A1* | 5/2012 | Paoletti | H02H 3/18 |
| | | | 361/63 |
| 2012/0181865 A1* | 7/2012 | Muthu | H02J 1/08 |
| | | | 307/26 |
| 2014/0012520 A1* | 1/2014 | Zhao | H02H 3/042 |
| | | | 702/58 |

OTHER PUBLICATIONS

Ke Jia, et al.; Fuzzy-Logic_Based Active Protection for Photovoltaic DC Power Plant; Apr. 2020; IEEE Transactions on Power Delivery; (IEEE [online]. ieeexplore.ieee.org [retrieved on Apr. 2, 2020]. Retrieved from the Internet: <URL:https://ieeexplore.ieee.org/stamp/stamp.jsp?tp=&arnumber=8684255> (Year: 2020).*
Zhu, Rui et al., "Active Control-based Protection for a Flexible DC System of a PV Power Plant" Electrical Power and Energy Systems, vol. 114, No. 105413, pp. 1-10, 2020.

* cited by examiner

*Primary Examiner* — Jared Fureman
*Assistant Examiner* — Nicolas Bellido
(74) *Attorney, Agent, or Firm* — Hunton AK, LLP

(57) ABSTRACT

A DC collection system for a PV power plant contains a large number of feeders. When a fault occurs, the fault current rapidly increases, causing electronic devices to block to protect themselves. This blockage presents a challenge to the protection of the DC collection system because of extremely short data windows. To address this challenge, a protection method based on active control of DC/DC converters is disclosed. The fault current control principle is analyzed and derived so that DC/DC converters can provide an injected low-amplitude and controllable post-fault stable current signal. The disclosed protection method is designed based on identifying the direction of the injected signal. Simulation results indicate that the fault section can be accurately identified and that the disclosed protection method performs efficiently against transition resistance and noise.

2 Claims, 27 Drawing Sheets

ACTIVE CONTROL-BASED PROTECTION SYSTEM AND METHOD FOR FLEXIBLE DIRECT CURRENT SYSTEM OF PHOTOVOLTAIC PLANT

FIELD OF THE INVENTION

The present disclosure relates generally to fault location and protection of power distribution system, and more particularly, to active control-based protection systems and methods for a flexible direct current (DC) system of a photovoltaic (PV) power plant.

BACKGROUND

Integration of PV power generation via a DC system can maximize output efficiency and prevent potential voltage oscillation of the DC system when the DC system is connecting to a weak alternating current (AC) system. The DC system may be a DC boosting and integrating system that may have many PV collection branches. The DC boosting and integrating system is characterized by a significantly short period of fault process owing to blocking control. Within such a short period of data window, existing protection algorithms are deigned based on the instantaneous value of transient current which contains random components. With the influence of various converter controls, the fault characteristics exhibits nonlinearity. This brings challenges to existing protections. Reliable fault section identification should achieve fast fault isolation and system recovery, which is important to ensure efficient and stable PV power integration.

SUMMARY

Aspects of the disclosed technology include active control-based protection systems and methods for a flexible DC collection system of a PV power plant.

Embodiments of the present disclosure provide an active control-based protection system for a flexible DC collection system of a PV power plant. The flexible DC collection system of the PV power plant may comprise: a plurality of PV arrays; a plurality of PV connection branches; a plurality of DC/DC converters, each DC/DC converter configured to connect one of the plurality of PV arrays to one of the plurality PV connection branches; a collector bus configured to connect to each of the plurality of PV connection branches; a delivery line connected to the collector bus; a plurality of connection branch protection relays, each connection branch protection relay positioned in one of the plurality of PV connection branches and connected to the collector bus; a delivery line protection relay positioned in the delivery line and connected to the collector bus; a DC/alternating current (AC) converter positioned in the delivery line and configured to connect the flexible DC connection system to an AC power grid; and a plurality of disconnectors, each disconnector positioned in one of the plurality of PV connection branches and disposed between a corresponding connection branch protection relay and the collector bus. The active control-based protection system comprises a controller in signal communication with the flexible DC connection system. The controller configured to: monitor and measure an output current value of each DC/DC converter; determine whether the output current value is greater than a self-protection current threshold of the DC/DC converter; in response to detecting the output current value being greater than the self-protection current threshold, determine that a fault has occurred; transmit a blocking signal to the plurality of DC/DC converters and the DC/AC converter to block the plurality of DC/DC converters and the DC/AC converter; determine whether the output current value is reduced to be within a first threshold range of zero, the first threshold range being from about zero to about 0.05 times a rated current value of the DC/DC converter; in response to determining the output current value is reduced to be within the first threshold range of zero, actively initiate a fault control of each DC/DC converter to generate by each DC/DC converter a controllable injected signal, wherein the controllable injected signal is a low-amplitude and polarity-stable current generated depending on output characteristics of PV arrays, an input voltage of each DC/DC converter continuously changes between an open-circuit voltage and a lower voltage, a duty cycle of each DC/DC converter is modified to be below about 0.5, and the input voltage is an output voltage of a PV array connected to each corresponding DC/DC converter; sum the controllable injected signal detected by each collection branch protection relay and the delivery line protection relay to obtain a injected signal sum, wherein the controllable injected signal detected by each collection branch protection relay and the delivery line protection relay is an average current over a predetermined period of time; determine whether the injected signal sum is within a second threshold range of zero, the second threshold range being from about zero to a restrained amount; in response to determining that the injected signal sum is not within the second threshold range of zero, identify the fault to have occurred in the collector bus, wherein a protection criterion for the collector bus is determined to be met and the protection criterion for the collector bus is a differential protection criterion; in response to determining that the injected signal sum is within the second threshold range of zero, identify the fault to have occurred in a PV collection branch if a direction of the controllable injected signal detected by the collection branch protection relay of that PV collection branch is consistent with a protection reference direction of that collection branch protection relay, wherein a protection criterion of that PV collection branch is determined to be met; in response to determining that the injected signal sum is within the second threshold range of zero, identify the fault to have occurred in the delivery line if a direction of the controllable injected signal detected by the delivery line protection relay is consistent with a protection reference direction of the delivery line protection relay, wherein a protection criterion of the delivery line is determined to be met; and transmit a trigger signal to a disconnector corresponding to the identified fault to isolate the fault and to recover the DC connection system.

Embodiments of the present disclosure provide an active control-based protection method for a flexible DC collection system of a PV power plant. The flexible DC collection system of the PV power plant may comprise: a plurality of PV arrays; a plurality of PV connection branches; a plurality of DC/DC converters, each DC/DC converter configured to connect one of the plurality of PV arrays to one of the plurality PV connection branches; a collector bus configured to connect to each of the plurality of PV connection branches; a delivery line connected to the collector bus; a plurality of connection branch protection relays, each connection branch protection relay positioned in one of the plurality of PV connection branches and connected to the collector bus; a delivery line protection relay positioned in the delivery line and connected to the collector bus; a DC/alternating current (AC) converter positioned in the delivery line and configured to connect the flexible DC connection system to an AC power grid; a plurality of disconnectors, each disconnector positioned in one of the plurality of PV connection branches and disposed between a corresponding connection branch protection relay and the collector bus; and a controller in signal communication with the flexible DC connection system. The method comprises: monitoring and measuring, by the controller, an output current value of each DC/DC converter; determining, by the controller, whether the output current value is greater than a self-protection current threshold of the DC/DC converter; in response to detecting the output current value being greater than the self-protection current threshold, determining, by the controller, that a fault has occurred; transmitting, by the controller, a blocking signal to the plurality of DC/DC converters and the DC/AC converter to block the plurality of DC/DC converters and the DC/AC converter; determining, by the controller, whether the output current value is reduced to be within a first threshold range of zero, the first threshold range being from about zero to about 0.05 times a rated current value of the DC/DC converter; in response to determining the output current value is reduced to be within the first threshold range of zero, actively initiating, by the controller, a fault control of each DC/DC converter to generate by each DC/DC converter a controllable injected signal, wherein the controllable injected signal is a low-amplitude and polarity-stable current generated depending on output characteristics of PV arrays, an input voltage of each DC/DC converter continuously changes between an open-circuit voltage and a lower voltage, a duty cycle of each DC/DC converter is modified to be below about 0.5, and the input voltage is an output voltage of a PV array connected to each corresponding DC/DC converter; summing, by the controller, the controllable injected signal detected by each collection branch protection relay and the delivery line protection relay to obtain a injected signal sum, wherein the controllable injected signal detected by each collection branch protection relay and the delivery line protection relay is an average current over a predetermined period of time; determining, by the controller, whether the injected signal sum is within a second threshold range of zero, the second threshold range being from about zero to a restrained amount; in response to determining that the injected signal sum is not within the second threshold range of zero, identifying, by the controller, the fault to have occurred in the collector bus, wherein a protection criterion for the collector bus is determined to be met and the protection criterion for the collector bus is a differential protection criterion; in response to determining that the injected signal sum is within the second threshold range of zero, identifying, by the controller, the fault to have occurred in a PV collection branch if a direction of the controllable injected signal detected by the collection branch protection relay of that PV collection branch is consistent with a protection reference direction of that collection branch protection relay, wherein a protection criterion of that PV collection branch is determined to be met; in response to determining that the injected signal sum is within the second threshold range of zero, identifying, by the controller, the fault to have occurred in the delivery line if a direction of the controllable injected signal detected by the delivery line protection relay is consistent with a protection reference direction of the delivery line protection relay, wherein a protection criterion of the delivery line is determined to be met; and transmitting, by the controller, a trigger signal to a disconnector corresponding to the identified fault to isolate the fault and to recover the DC connection system.

Further features of the disclosed systems and methods, and the advantages offered thereby, are explained in greater detail hereinafter with reference to specific example embodiments illustrated in the accompanying drawings

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION

Figure 1:
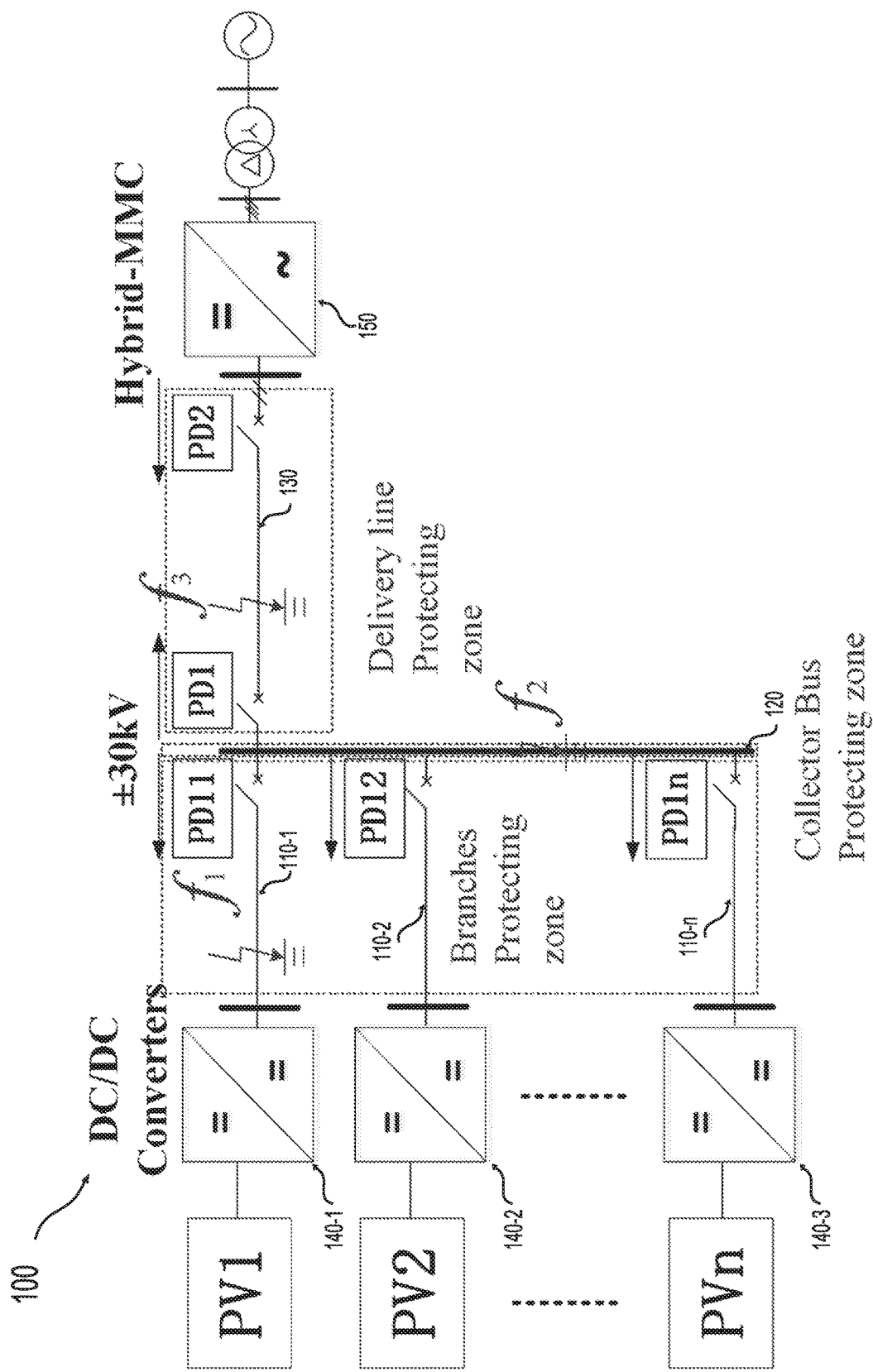
FIG. 1 shows a topology of an example flexible DC collection system of a PV power plant according to an embodiment of the present disclosure.

Exemplary embodiments of the invention will now be described in order to illustrate various features of the invention. The embodiments described herein are not intended to be limiting as to the scope of the invention, but rather are intended to provide examples of the components, use, and operation of the invention. The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

A DC collection system for a PV power plant may contain a large number of feeders. When a fault occurs, the fault current rapidly increases, causing power electronic devices to block to protect themselves. This blockage presents a challenge to the protection of the DC collection system because of extremely short data windows. To address this challenge, a protection method based on active control is disclosed herein. The fault current control principle is analyzed and derived so that DC/DC converters can provide an injected low-amplitude and controllable post-fault stable current signal. The system protection algorithm disclosed herein is designed based on identifying the direction of the generated injected signal. Simulation results indicate that the fault section can be accurately identified and that the disclosed protection method performs efficiently against transition resistance and noise. A highly reliable and complete protective action can be completed within 5 milliseconds (ms) after a fault occurs, with grounding impedance, noise, and distributed capacitance considered. The disclosed protection method and system provide a solution for DC system protection.

I. INTRODUCTION

Research in fault section identification mainly focuses on computations based on the instantaneous value of transient fault current, which is extracted through a considerably short data window. In accordance with the principle on which they are based, these fault section identification methods can be classified based on traveling waves, parameter identification, and Kirchhoff current law.

Because of its fast operating speed, traveling-wave protection is commonly applied in high-voltage, long-distance transmission projects. Dispersion, natural frequency, and reflection are the approaches most commonly used to identify an internal fault. Frequency domain analysis is also a main analytical method used in the traveling-wave protection. A method based on wavelet analysis of current wave may be used. A non-unit line protection can also be used, which is based on the identifying voltage waveform processed using a morphological gradient, with the series inductors on the end of each line as the border. Directional pilot protection may be used as well, which utilizes the propagation time difference between the forward-traveling wave and the backward-traveling wave of mode 6 to recognize a faulty line. Algorithms based on traveling waves can identify a fault point with distributed capacitance considered; however, in multi-branched structures, the accuracy of identification is significantly reduced and is prone to be influenced by fault resistance.

Current- or voltage-derivative protection and high-frequency impedance protection based on parameter identification may be used in fault section identification. A faulty section is identified by deriving parameters of the fault loop from the measured current and voltage. An internal fault recognition algorithm based on the changing rate of the voltage of a reactor can be used. Also a protection scheme based on the natural characteristics of DC and its first and second derivatives may be used. A high-frequency impedance protection can be used as well. All of these methods can be rapidly performed with a small number of samples; meanwhile, they ignore the effect of random components, such as, noise, distributed capacitance, etc. which could reduce the reliability of these techniques.

Methods based on Kirchhoff's current law are referred to as differential or directional pilot protection, which use the characteristics that all currents flow into the internal fault section. Pilot differential protection based on calculated power may be used. Meanwhile, a phasor differential protection scheme based on instantaneous sampling can also be used. These approaches may increase the speed of traditional differential protection and the ability to withstand noise, however, in extremely short data windows, transient capacitance current can affect reliability.

The present disclosure provides a recognition method for fault section identification. This technique is based on the cooperation between the DC/DC converter active control and the protection device. In contrast to existing DC system protection algorithms, fault section identification disclosed herein is based on controllable post-fault stable current generated by a DC/DC converter, which can achieve quick fault section identification with improved reliability.

The protection method disclosed herein may exhibit the following main features. The relationship between the duty cycle and the output current of the DC/DC converter is derived and used as a basis for the fault control method of the DC/DC converter. The DC converter may be an isolated boost full-bridge converter (IBFBC). According to the design disclosed herein, the IBFBC can serve as a current source when combined with PV arrays, which can generate reliable current characteristics for protection to identify the fault section. In this disclosure, the protection relays ((PD11 ... PD1$n$ and PD1 in FIG. 1) directly connected to the collector bus are the only necessary components for identifying fault sections in this disclosed scheme. The fault section can be determined by identifying the polarity of branch current and the sum of the currents passing through the collector bus, which are generated by DC/DC converters in the fault control state.

The remainder of this disclosure is organized as follows: Section II introduces the fault response of the devices in the PV DC boosting integration system; Section III enumerates the fault control methods used to actively generate current for fault section identification; in Section IV, the fault region recognition method is presented; the performance of the disclosed scheme is verified by simulation in Section V; and conclusions are provided.

II. DC COLLECTION SYSTEM OF PV POWER PLANT

A. Fault Analysis of DC Boosting Integration System

An example DC collection system 100 of a PV power plant is modeled by the topology shown in FIG. 1. In this model, protection zones may be divided into PV collection branches 110-1, 110-2 ... 110-$n$, a collector bus 120, and a DC delivery line 130, as shown in FIG. 1. The DC collection system 100 may further comprise a plurality of disconnectors (not shown in FIG. 1) corresponding to the PV collection branches. Each of the plurality of disconnectors is positioned in a corresponding PV collection branch and may be disposed between a corresponding branch protection relay and the collector bus 120.

PV arrays PV1, PV2 ... PV$n$ connect to the collector bus 120 through DC/DC converters 140-1, 140-2 ... 140-$n$ and branches 110-1, 110-2 ... 110-$n$, respectively. The flexible DC system 100 of the PV power plant is integrated with an alternating current (AC) system via a modular multilevel converter (MMC) 150 that consists of half-bridge submodules (HBSMs) and full-bridge submodules (FBSMs). The MMC is an example of a DC/AC converter. In some embodiments, other types of DC/AC converters may be used, for example, MMC with only FBSMs, MMC with Clamp Diode submodules (CDSM) and other type of MMC which can extinguish the DC fault current.]

Each collection branch has a low capacity and a significantly short transmission distance, which can be protected based on local measurement. Since DC circuit breakers are relatively expensive, and their performance requires further verification. The task of protection involves identifying a fault zone and isolating the fault accurately and rapidly using a disconnector to achieve a rapid system recovery.

B. Fault Characteristics of MMC

Figure 2:
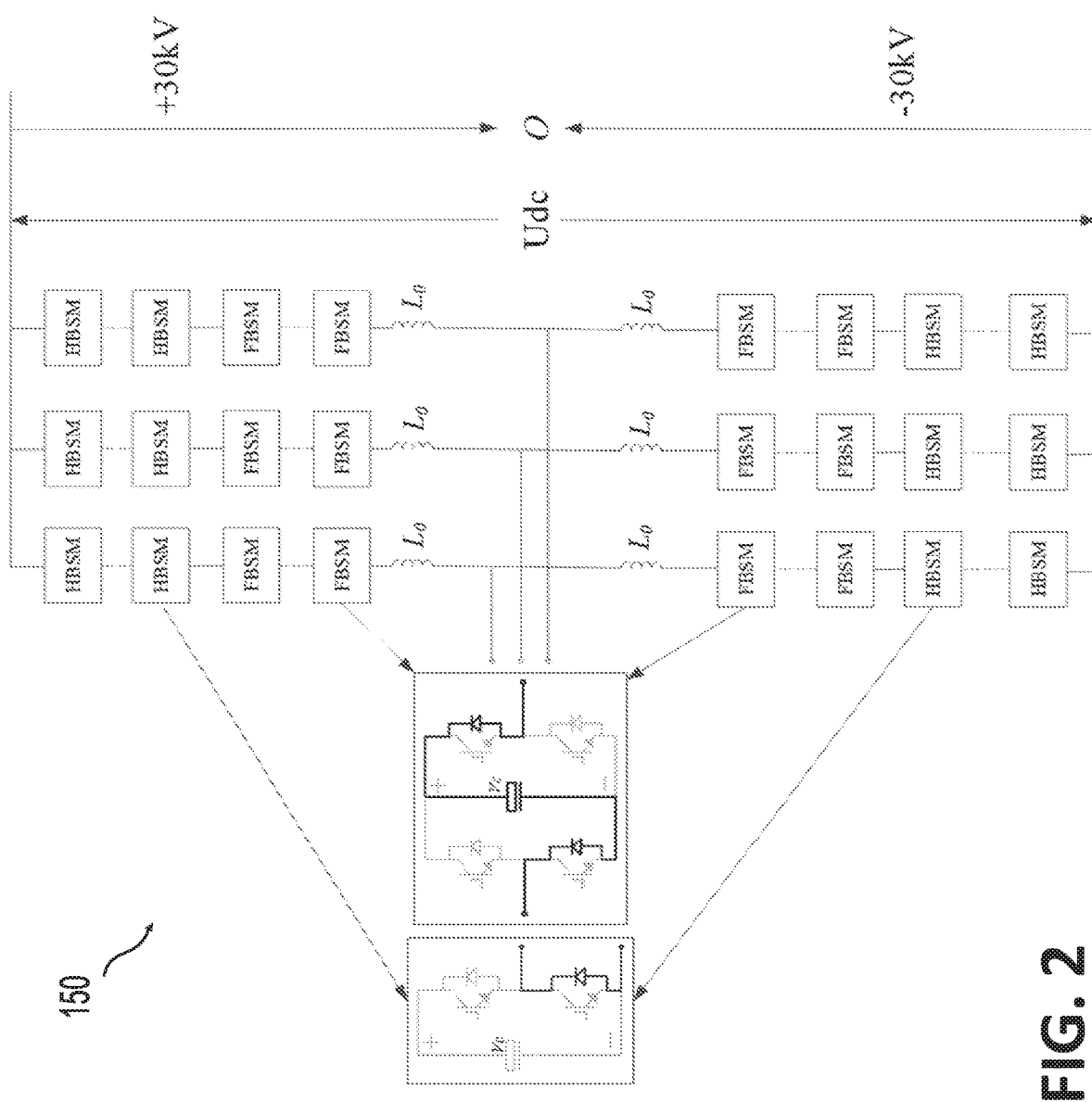
FIG. 2 shows a structure of an example modular multi-level converter (MMC) according to an embodiment of the present disclosure.

MMCs with hybrid submodules of HBSM and FBSM can extinguish a DC fault current. The structure of an example MMC 150 is illustrated in FIG. 2. When a DC fault occurs, the fault current from the AC system feeds into the DC fault point via the bridge arms. Simultaneously, the submodule capacitor discharges rapidly.

The discharging path of all submodules is blocked after the blocking criterion of the device protection is satisfied. Consequently, the half-bridge submodule is bypassed to block the capacitor discharge path. When the voltage of the capacitor is lower than the peak value of grid voltage, full-bridge submodules stop charging their capacitor and extinguish the AC feeding current. The current path of each submodule is illustrated in FIG. 2

C. Fault Characteristics of DC/DC Boosting Converter

Figure 3:
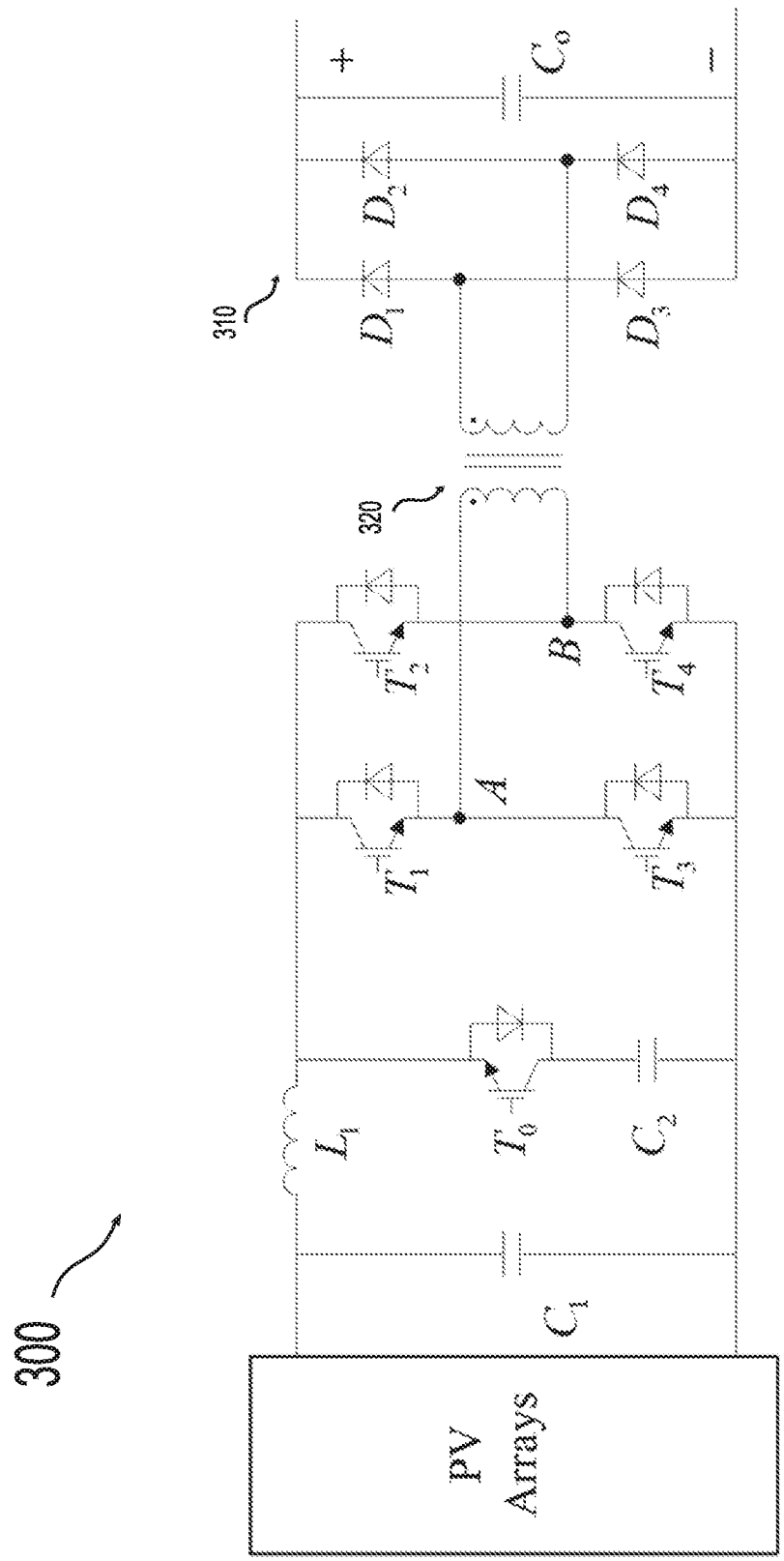
FIG. 3 shows a topology of an example DC/DC boosting converter according to an embodiment of the present disclosure.

DC/DC boosting converters 140-1, 140-2 ... 140-$n$ in the DC system 100 can achieve the maximum power point tracking (MPPT) control and boosting DC voltage. They are characterized by small unit capacity and good economy. The topology of an example DC/DC boosting converter 300 is illustrated in FIG. 3.

Figure 4:
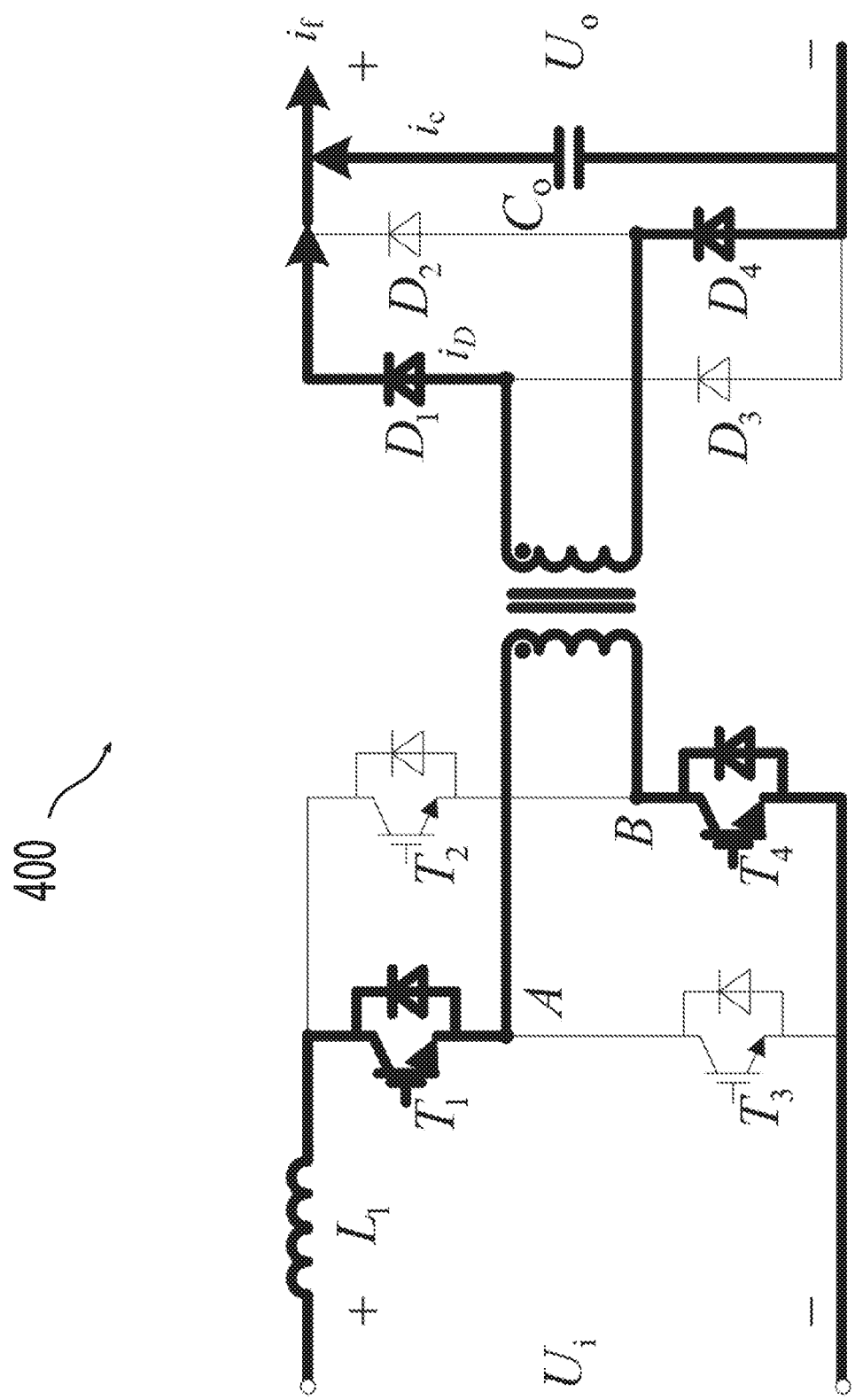
FIG. 4 shows a fault current path of a DC/DC converter according to an embodiment of the present disclosure.

The topology of the DC/DC boosting converter 300 may be an IBFBC. Due to single-direction power transmission, the full-control converter can be replaced with diode bridges 310 on the high-voltage side to ensure the economy of large-scale applications. The structure of the DC/DC boosting converter 300 may comprise an input inductor $L_1$, an isolated booster transformer 320, and a full-bridge inverter circuit. To absorb the voltage spike generated by turning off the insulated-gate bipolar translator (IGBT), $T_o$ and $C_2$ are connected in series, forming an active clamp circuit. The fault current path of the DC/DC boosting converter 300 after a fault is shown in FIG. 4.

The value of feeding current from PV arrays is considerably smaller than the capacitor discharging current. The main component of the DC/DC output current $i_f$ is the discharge current of the capacitor $C_o$. Owing to the inductor $L_1$, the arm current slowly rises until it reaches nearly twice the rated current at which point the IGBT is automatically blocked. The feeding current from PV arrays is then extinguished gradually, as shown in FIG. 5.

Figure 5:
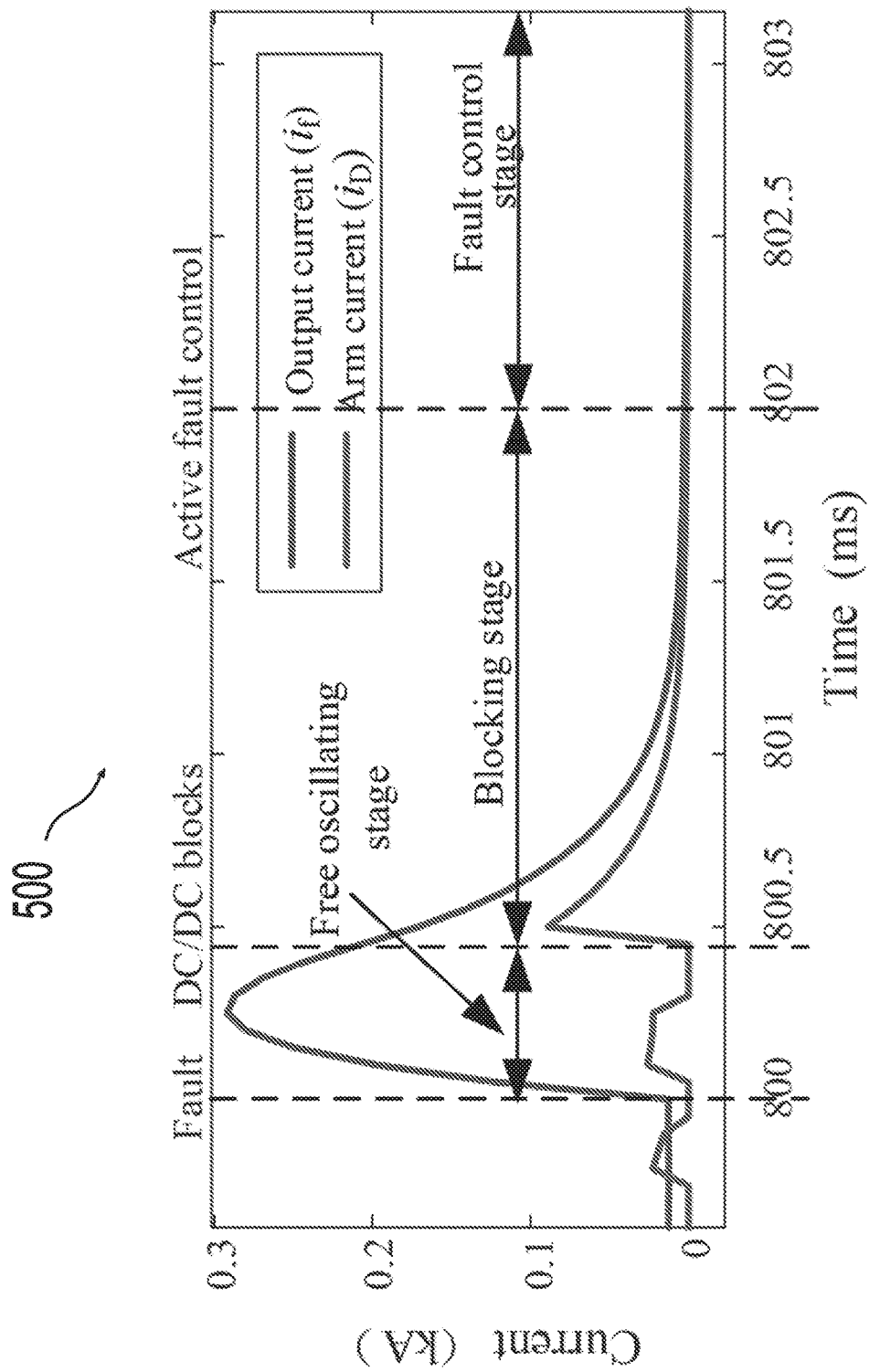
FIG. 5 shows an example diagram of fault current of a DC/DC converter according to an embodiment of the present disclosure.

As shown in FIG. 5, the fault process can be divided, based on the blocking time of the DC/DC converter, into two stages: a free-oscillation stage and a blocked stage. In the former, the output current comprises PV feeding current and capacitor discharging current, whereas in the latter, the PV feeding current starts being extinguished. The diode bridge on the high-voltage side and the line reactance form a new fault loop in which the dying current can cause an induced electromotive force in the inductor. The fault is gradually extinguished, which may be completed after 1.5 ms. Following these two stages, the low-amplitude controllable fault currents generated by the active control of the DC/DC converter may improve the reliability of fault region identification.

III. FAULT ACTIVE CONTROL PRINCIPLE OF DC/DC BOOSTING CONVERTER

A. Control Principle of DC/DC Converter Under Normal Conditions

Figure 6:
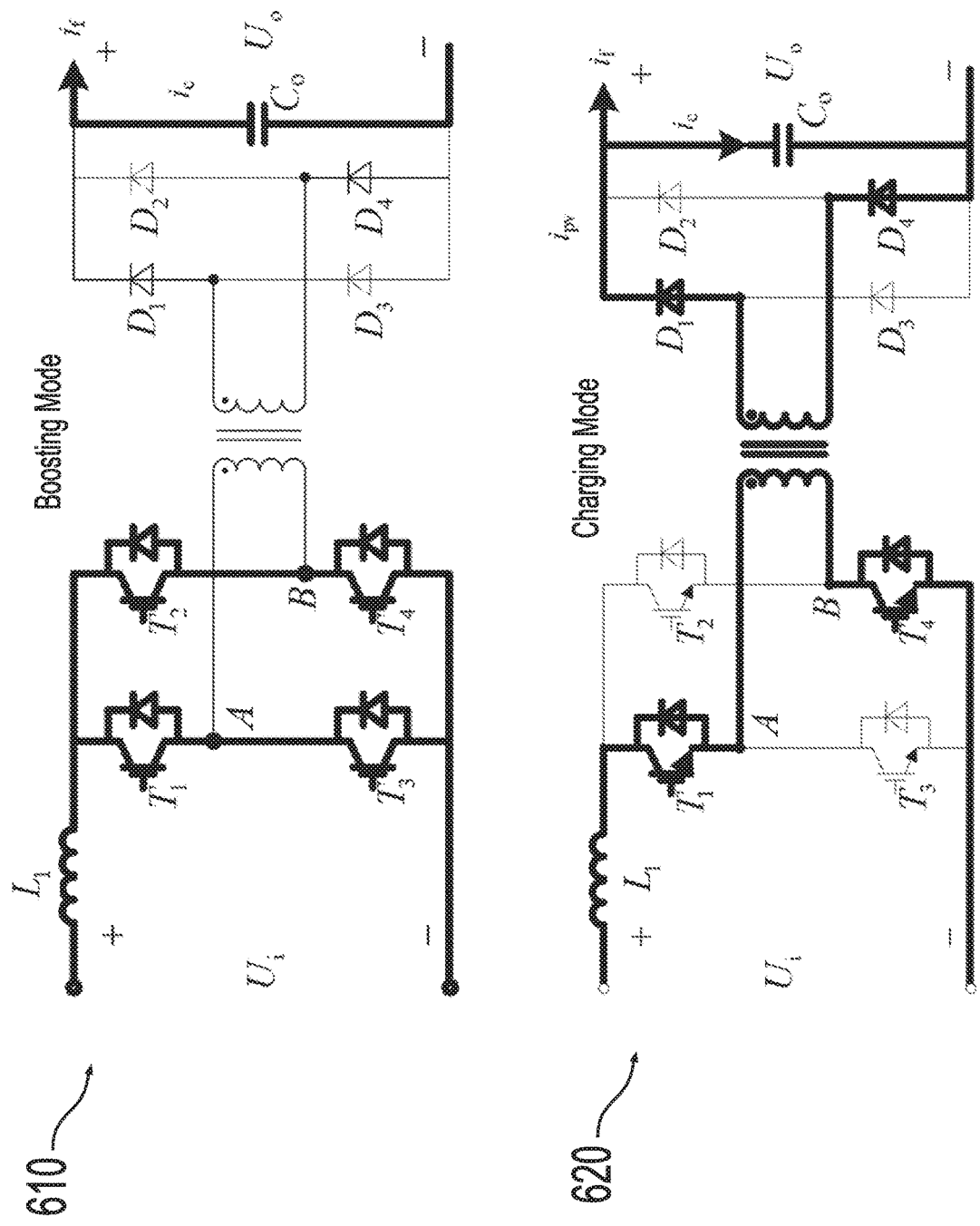
FIG. 6 shows an example working mode of a DC/DC converter under normal conditions according to an embodiment of the present disclosure.

Under normal conditions, the control target is aimed at tracking the maximum power point of the PV arrays by modifying the voltage boosting ratio, thereby controlling the PV output power. The DC/DC converter operates with a duty ratio greater than 0.5, implying that a time interval exists within which all upper and lower arms are simultaneously turned on. Accordingly, the working process of the circuit can be divided into a boosting mode 610 and a charging mode 620, as shown in FIG. 6.

In the boosting mode 610, the PV arrays charge the inductor $L_1$, and the current passing through the inductor $L_1$ increases linearly. The load is powered by the capacitor $C_o$ on the high-voltage side. In the charging mode 620, $T_1$, $T_4$ and $T_2$, $T_3$ are alternately turned on. A path is formed, which includes the inductor $L_1$, the high-frequency transformer, the full-conversion circuit, and the load. The energy stored in the inductor $L_1$ charges the capacitor $C_o$, and the current passing through the inductor $L_1$ decreases linearly.

Analysis indicates that the boosting mode 610 and the charging mode 620 operate alternately. In the boosting mode 610, the PV arrays charge the energy storage inductor $L_1$, whereas in the charging mode 620, the inductor $L_1$ discharges energy. In one switching cycle, the absorbed energy of the inductor $L_1$ is equal to the released energy of the inductor $L_1$ from which the voltage transfer ratio is derived.

In the boosting mode, all IGBTs are turned on, and the input voltage U of the DC/DC converter is derived in equation (1).

$$U_i = L_1 \frac{di_L}{dt} \tag{1}$$

where $L_1$ is the inductance, $i_L$ is the instantaneous value of the inductor current, and $U_i$ is the input voltage.

Similarly, in the charging mode, the change of the induced electromotive force caused by the change in the inductor current $i_L$ can be derived in equation (2):

$$U_i - \frac{U_o}{n_T} = L_1 \frac{di_L}{dt} \tag{2}$$

where $n_T$ is the transformer ratio, and $U_o$ is the output voltage of the DC/DC converter on the high-voltage side.

The inductor current $i_L$ is continuous in one cycle. The equations (1) and (2) can be expressed based on the extreme values of the inductor current $i_L$ in one cycle as equations (3) and (4), respectively:

$$U_i = L_1 \frac{i_{Lmax} - i_{Lmin}}{T_{on}} \tag{3}$$

$$U_i - \frac{U_o}{n_T} = L_1 \frac{i_{Lmin} - i_{Lmax}}{T_{off}} \tag{4}$$

where $T_{on}$ indicates the time when IGBT is turned on, and $T_{off}$ indicates the time when IGBT is turned off. The relationship between the output voltage $U_o$ and the input voltage $U_i$ is then derived in equation (5):

$$U_o = \frac{T_{on} + T_{off}}{T_{off}} n_T U_i \tag{5}$$

With the duty ratio denoted by D, the aforementioned equation (5) can be expressed as equation (6):

$$U_o = \frac{n_1 U_i}{2(1-D)} \tag{6}$$

From the aforementioned equations, the voltage boosting ratio can be controlled by modifying the duty cycle of the trigger signal.

B. Fault Control Principle of DC/DC Boosting Converter

The impact of fault current can be largely suppressed because of the inductor $L_1$. For the same reason, this DC/DC converter topology can restart fault control after blocking, providing a controllable current signal to identify the fault zone.

In the fault control stage, the post-fault controllable current is achieved by forcing the PV voltage to continuously change between the open circuit voltage and a certain low voltage. To obtain a small fault current, the duty cycle is modified below 0.5. The switching logic timing diagram of $T_1$ to $T_4$ is shown in FIG. 7.

Figure 7:
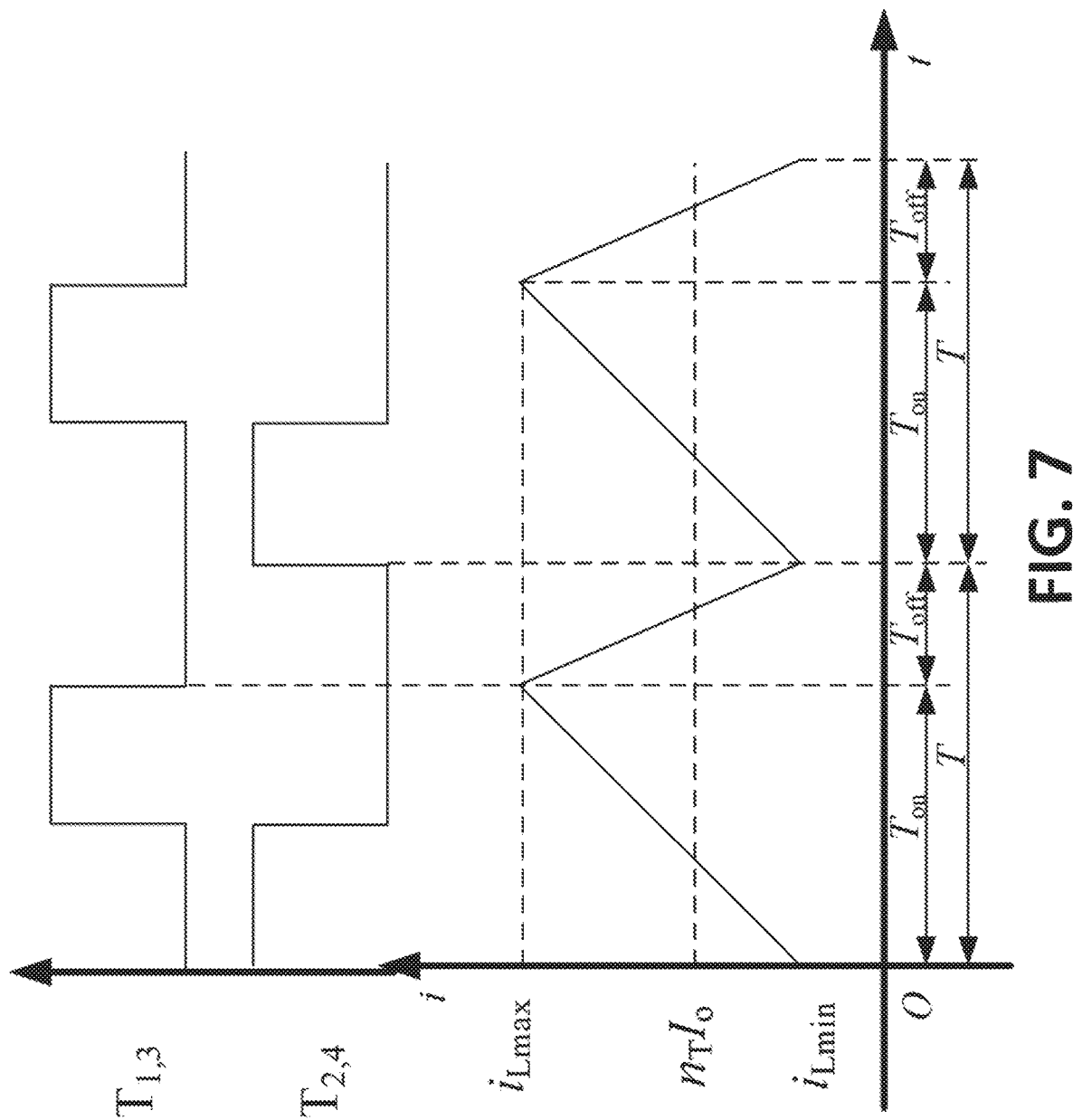
FIG. 7 shows an example timing diagram in switching logic of a DC/DC converter during a fault control stage according to an embodiment of the present disclosure.

As shown in FIG. 7, when the bridge arms are turned on sequentially, the photovoltaics are switched from an open circuit to a short circuit. The inductor $L_1$ discharges simultaneously. After the bridge arms are turned off, the PV arrays start charging the inductor $L_1$. The current paths of these two periods are presented in FIG. 8.

Figure 8:
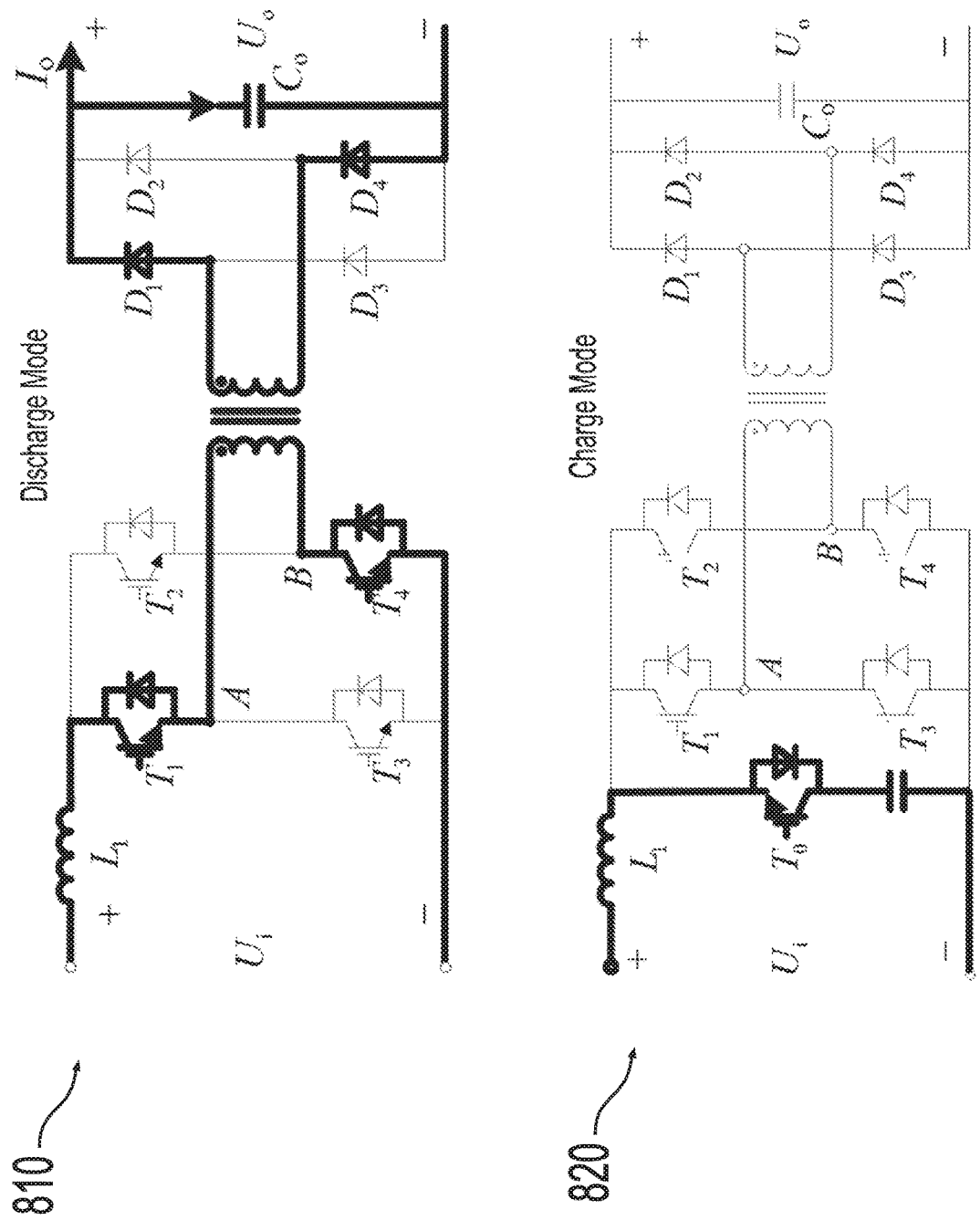
FIG. 8 shows current paths of different modes of a DC/DC converter during a fault control stage according to an embodiment of the present disclosure.

As shown in FIG. 8, the process can be divided, based on the status of the inductor $L_1$, into the discharge mode 810 and the charge mode 820. Each mode has a corresponding duration of $T_{on}$ and $T_{off}$ as illustrated in FIG. 7. In the discharge mode 810, the full-bridge conversion circuit is in a conducting state in a positive or reversed direction. The PV voltage gradually decreases, because the PV arrays are connected to the short circuit. As the PV voltage deviates from the maximum operating point, the current output also decreases. PV arrays are equivalent to a controlled current source whose output current is only related to the PV output voltage. In the linear section, the ratio of the output voltage to the output current can be considered as $R_{SH}$. In the charge mode, the full-bridge conversion circuit is in the off state, and the PV arrays output an open-circuit voltage.

The switching frequency of $T_1$ to $T_4$ may range from about 1 kHz to about 3.3 kHz. Thus, the inductor $L_1$ charging or discharging can be estimated to be a linear process.

Based on the difference between the maximum and minimum values of the inductor current during fluctuation of a switching period, the root mean square (RMS) value can be derived from the area of the current waveform envelope in one cycle. The output current $I_o$ can be expressed in equation (7):

$$I_o = \frac{1}{T n_T} \cdot \frac{1}{2} (i_{Lmax} - i_{Lmin}) T_{on} \tag{7}$$

where T is the time of duty cycle, as shown in FIG. 7.

In the charging mode, according to the equation (3), the inductor voltage $U_L$ obeys the equation (8) below:

$$U_L = L_1 \frac{i_{Lmax} - i_{Lmin}}{T_{off}} \qquad (8)$$

To simplify the equation (7), the equation (8) is inserted into the equation (7) to obtain the output current Io as expressed in equation (9):

$$I_o = \frac{1}{Tn_T} \cdot \frac{1}{2}\frac{U_i}{L_1} T_{off} \cdot T_{on} \qquad (9)$$

According to FIG. 7, the duration of discharging mode $T_{on}$ and the duty ratio D satisfy the relationship expressed in equation (10):

$$D = \frac{T_{on}}{2T} \qquad (10)$$

and the $T_{off}$ satisfy the relationship expressed in equation (11):

$$\frac{T_{off}}{T} = 1 - 2D \qquad (11)$$

Therefore, the equation (9) can be further simplified as equation (12):

$$I_o = \frac{TU_i}{n_T L_1} D(1-2D) \qquad (12)$$

To further measure the approximate value of the output current, the linear variation of $U_i$ between the maximum open-circuit voltage and a certain voltage $U_{min}$ is considered. The longer the conduction time, the lower the PV voltage decreases. Therefore, $U_i$ in the aforementioned equation can also be expressed in equation (13):

$$U_i = U_{oc}(1-kDT) \qquad (13)$$

where $U_{oc}$ is the PV open-circuit voltage, and k is the rate of decline, which can be approximated in equation (14):

$$k = \frac{U_{oc}}{L_1 R_{SH}} \qquad (14)$$

In the fault control stage, the DC/DC converter is equivalent to a current source that provides a stable fault current to the fault point.

IV. METHOD OF FAULT REGION IDENTIFICATION BASED ON FAULT ACTIVE CONTROL

A. Identification of Internal Fault

During the transient process, the current oscillates, and its instantaneous polarity can no longer reflect the direction of the current. In the fault control stage, the DC/DC converter can provide a fault current with a small amplitude and stable polarity, as discussed in Section III. Fault region identification can be achieved by fault control and directional protection relays. The distribution of fault currents in the topology of the DC collection system 100 when a fault occurs in a collection branch is presented in FIG. 9.

The DC/DC boosting converter can initiate a fault control after the entire system undergoes the free-oscillation stage and the blocked stage, which is equivalent to a current source outputting a stable current signal. In the faulty branch (e.g., branch 110-1 in FIG. 9), the current from the converter flows directly into the fault point $f_1$ in FIG. 9. In the healthy branches (e.g., branches 110-2 ... 110-n in FIG. 9), the fault currents generated by the corresponding converters flow into the fault point $f_1$ through the collector bus and the protection PD11 on the faulty branch 110-1. The current sensed by each corresponding healthy branch protection relay (e.g., PD12 ... PD1n in FIG. 9) flows opposite the reference direction, whereas the current sensed by the faulty branch protection relay PD11 is consistent with the reference direction. The MMC is blocked, so both of the protection relays (PD1 and PD2) on the delivery line cannot sense any fault current.

Figure 10:
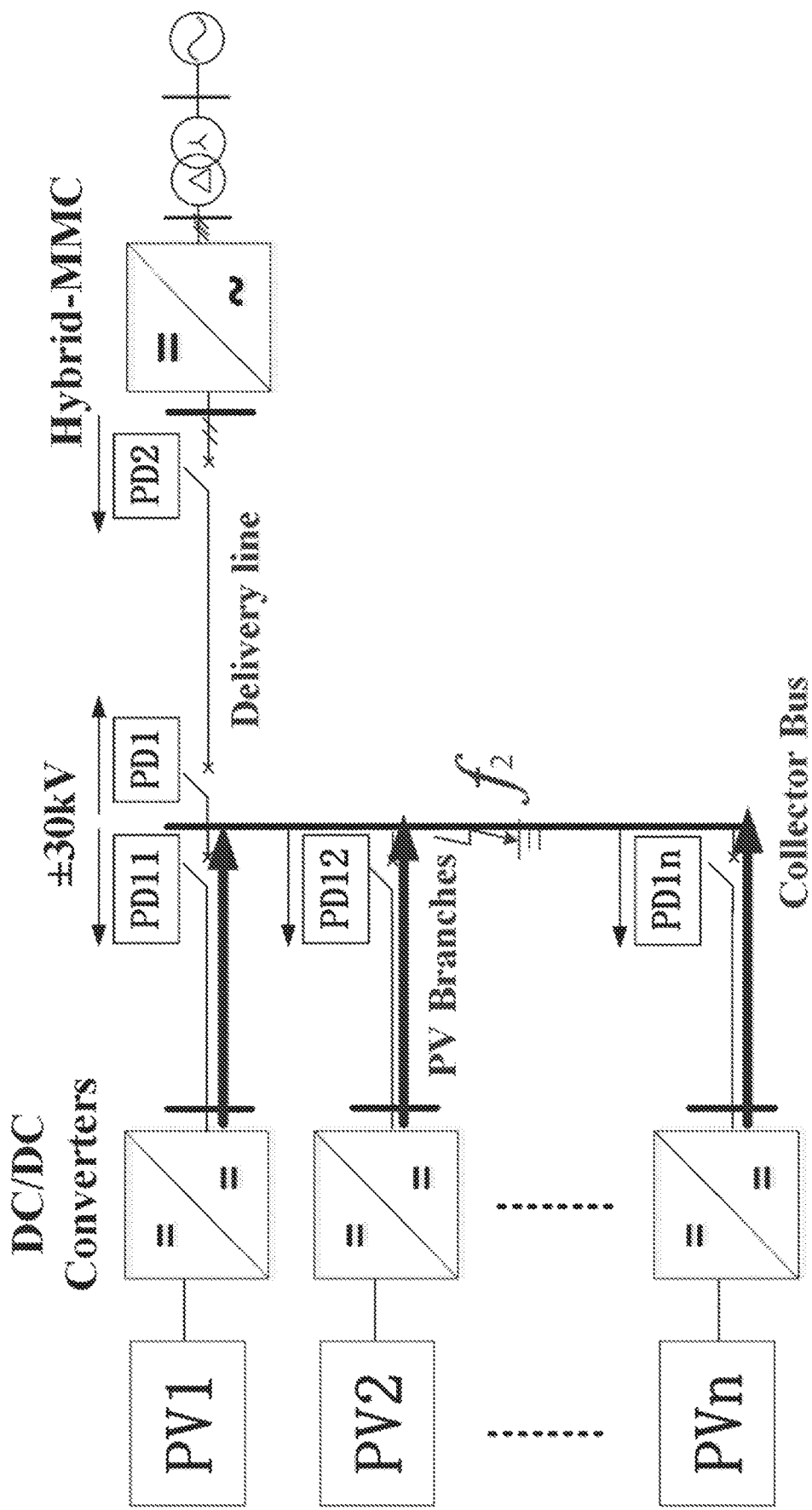
FIG. 10 shows an example fault current distribution of a flexible DC collection system when a fault occurs on a collector bus according to an embodiment of the present disclosure.

The current distribution when a fault occurs on the collector bus is illustrated in FIG. 10. As shown in FIG. 10, when a fault $f_2$ occurs on the collector bus, all branch currents generated by the corresponding DC/DC converters flow into the collecting bus. All protection relays connected to the collector bus can sense the fault currents flowing opposite the reference direction, except for PD1 on the delivery line. Therefore, the collector bus fault $f_2$ can be recognized by computing the sum of currents measured by all protection relays directly connected to the collector bus. If the sum is much greater than zero, an internal fault can be recognized.

Figure 11:
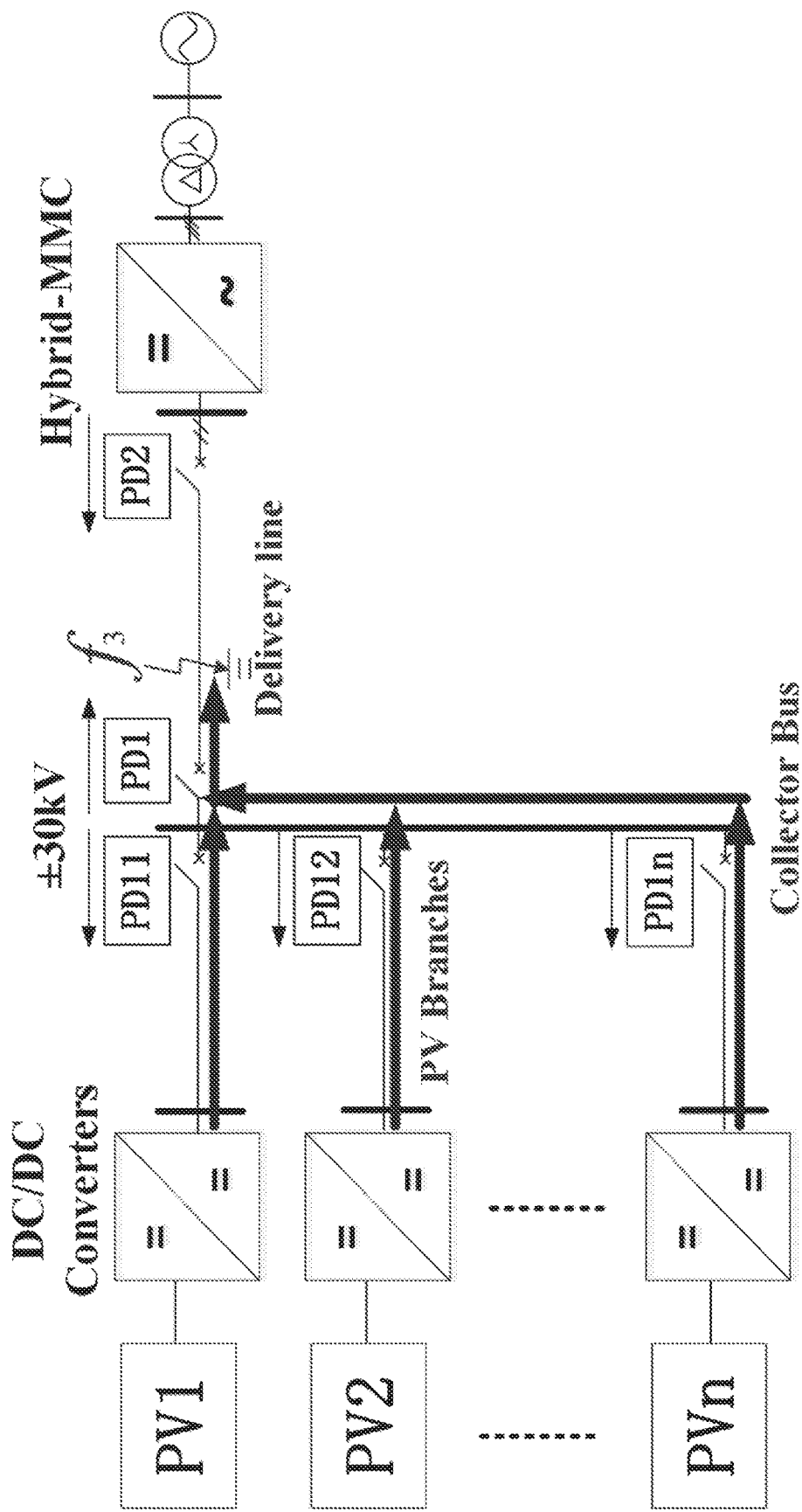
FIG. 11 shows an example fault current distribution of a flexible DC collection system when a fault occurs on a delivery line according to an embodiment of the present disclosure.

The current distribution when a fault occurs on the DC delivery line is illustrated in FIG. 11. As shown in FIG. 11, when a fault $f_3$ occurs in the delivery line, the direction of the fault current sensed by the corresponding branch line protection relay is opposite the reference direction. The currents flow through the protection relays (PD11 ... PD1n and PD1) connected to the collector bus, with a sum of zero. For the DC delivery line, the protection relay PD1 can sense the fault current moving in the reference direction.

On the basis of the aforementioned analysis, a fault line can be recognized using a simple logic to ensure reliability. Situations in which faults occur in different locations are simulated, and the results of each relay are as follows in Table 1.

TABLE 1

Protection detection results for various section faults

|  | PD11 | PD12 | PD1x | PD1 | PDΣ |
|---|---|---|---|---|---|
| Branch Fault ($f_1$) | + | — | — | / | 0 |
| Bus Fault ($f_2$) | — | — | — | / | 1 |
| Delivery line Fault ($f_3$) | — | — | — | + | 0 |

Notes:
"+" indicates that the current direction is consistent with the protection reference direction; "—" indicates that the current direction is opposite the protection reference direction; "/" indicates that the relay does not detect the fault current; "PDΣ" indicates the sum of the currents of all relays; "0" indicates that the current sum is zero; "1" indicates that the current flowing in is not zero.

B. Protection Criteria and Action Flow

To protect the collection branches and the delivery line, the internal fault can be recognized by identifying the direction of current generated via an active control of the DC/DC converters. The collector bus fault can be recognized by computing the sum of the currents flowing in. With this basic logic, the protection criteria of these three zones are separately designed.

In the protecting zones of collection branches and delivery line, an internal fault can be identified by comparing the direction of the current generated by the DC/DC converter with the reference direction. With consideration of data deviations and errors caused by interference or hardware devices, the protection criterion is set based on an average of all data within a certain period, as shown in equation (15) below:

$$\frac{\sum_{k=1}^{n} i_k}{n} \geq 0 \tag{15}$$

where $i_k$ represents the instantaneous value of controllable post-fault current; n is the quantity of the data; $n=f_s \cdot T_p$, where $f_s$ is the sampling frequency; and $T_p$ is the length of the data window, which may be set to 1 ms, for example.

The percentage restrained criterion for the collector bus can be set based on Kirchhoff's current law with the average of the instantaneous values, which is expressed in equation (16):

$$\left| \sum_{j=1}^{N} \left( \frac{\sum_{k=1}^{n} i_{kj}}{n} \right) \right| - K_{res} \sum_{j=1}^{N} \left| \frac{\sum_{k=1}^{n} i_{kj}}{n} \right| \geq 0 \tag{16}$$

where j represents the jth protection relay connected to the collector bus. To prevent the protection from improper operation, the ratio braking coefficient $K_{res}$ ranging from about 0.3 to about 0.5 may be used. This value is lower than that of AC protection because in the fault control stage, the unbalanced current is only the measurement error of the protection.

Figure 12:
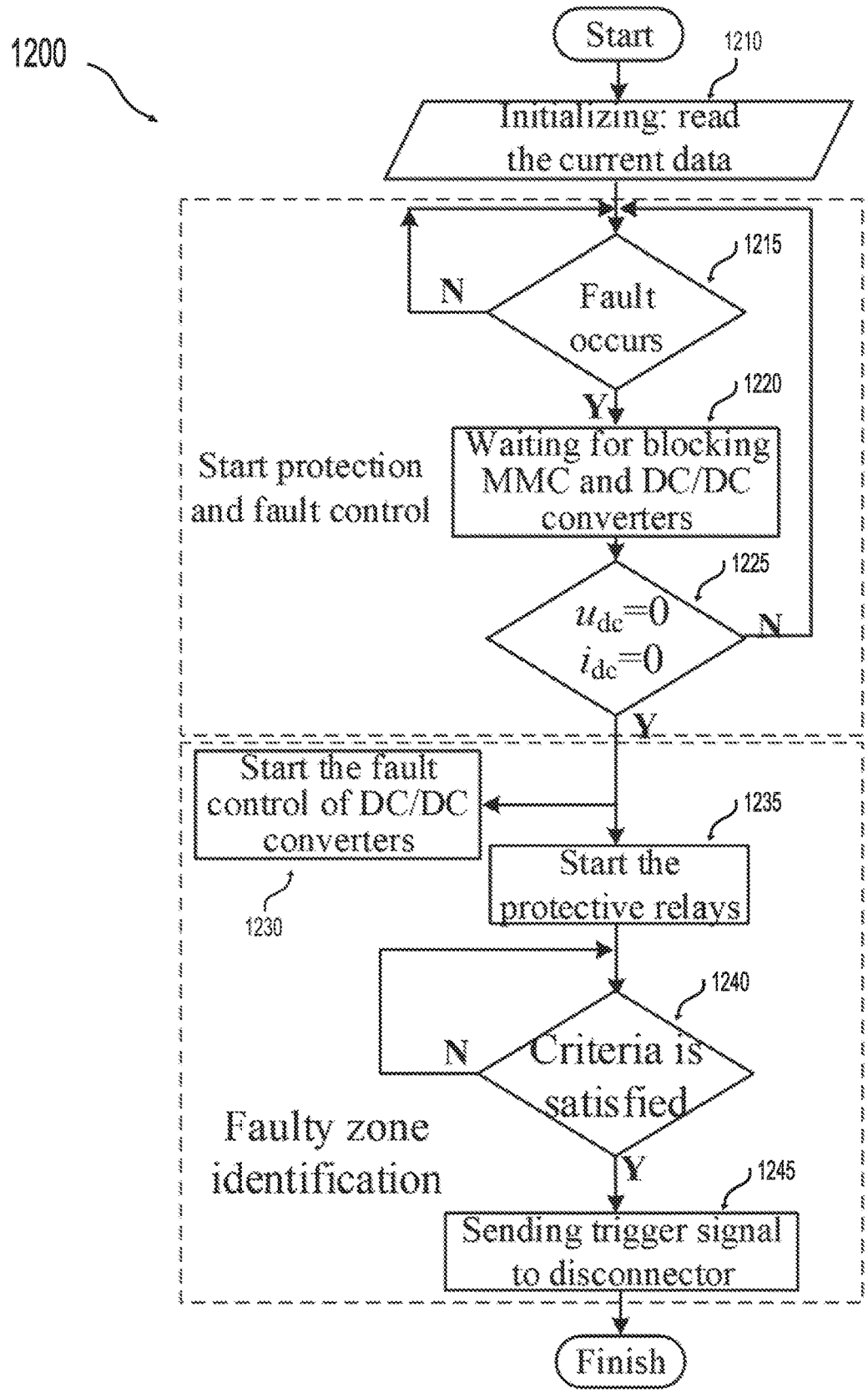
FIG. 12 shows a flow chart of active control-based protection method according to an embodiment of the present disclosure.

A flow chart of disclosed active control-based protection method 1200 including fault region identification is presented in FIG. 12. In block 1210, an output current value of each DC/DC converter at a measurement point of the collection branch connecting the corresponding DC/DC converter to the collector bus is monitored and measured. In block 1215, whether or not a fault occurs is determined by determining whether the output current value is greater than a self-protection current threshold of the DC/DC converter. In block 1220, in response to detecting the output current value being greater than the self-protection current threshold, a blocking signal is transmitted to the plurality of DC/DC converters and the MMC to block the plurality of DC/DC converters and the MMC. That is, in the blocks 1210-1220, a fault is first identified in the free-oscillation stage and until all converters are blocked. This process may take about 0.5-2 ms, depending on fault locations.

In block 1225, it is determined whether the output current value is reduced to be within a first threshold range of zero. The first threshold range can be a range from about zero to about 0.05 times a rated current value of the DC/DC converter. In block 1230, in response to determining that the output current value is reduced to be within the first threshold range of zero, a fault control of each DC/DC converter is actively initiated to generate by each DC/DC converter a controllable injected signal current. The controllable injected signal is a low-amplitude and polarity-stable current generated by continuously changing an input voltage of each DC/DC converter between an open-circuit voltage and a lower voltage and by modifying a duty cycle of each DC/DC converter to be below 0.5, and the input voltage is an output voltage of a PV array connected to each corresponding DC/DC converter. The low-amplitude and polarity-stable current is generated depending on output characteristics of the PV arrays. That is, after receiving the signal of the DC/DC converters' self-protection criterion which can identify the fault condition, the DC/DC converter starts the fault control when the transient fault current is reduced to be within the first threshold range of zero, which continues for about 1-5 ms.

In blocks 1235 and 1240, simultaneously, all protection relays start locating the faulty line in accordance with their protection criterion. Specifically, the controllable injected signal detected by each protection relay is added together to obtain an injected signal sum. The injected signal detected by each protection relay may be an average current over a predetermined period of time or a predetermined data window length (e.g., 1 ms). Then, it is determined whether the injected signal sum is within a second threshold range of zero. The second threshold range can be a range from about zero to a restrained amount. The restrained amount may be an amount $I_{th}$ determined using equation (17):

$$I_{th} = K_{res} \sum_{j=1}^{N} \left| \frac{\sum_{k=1}^{n} i_{kj}}{n} \right| \tag{17}$$

If the sum is determined not to be within the second threshold range of zero, then the fault is identified to have occurred in the collector bus. Accordingly, in situations where the fault occurs in the collector bus, a protection criterion for the collector bus may be set. The protection criterion for the collector bus can be a differential protection criterion such as a percentage-restrained criterion shown in the equation (16). If the sum is determined to be within the second threshold range of zero, the fault can be identified to have occurred in a collection branch if a direction of the injected signal detected by the protection relay of that collection branch is consistent with a protection reference direction of that protection relay. Accordingly, a protection criterion of a collection branch can be set as in the equation (15), which indicates the injected signal detected by the protection relay of that collection branch is a nonnegative current when the fault occurs in that collection branch.

Alternatively, if the sum is determined to be within the second threshold range of zero, the fault can be identified to have occurred in the delivery line if a direction of the injected signal detected by the protection relay (e.g., PD1) of the delivery line is consistent with a protection reference direction of that protection relay. Accordingly, a protection criterion of the delivery line can be set as in the equation (15), which indicates the injected signal detected by the protection relay of the delivery line is a nonnegative current when the fault occurs in the delivery line.

In block 1245, when the protection criterion is met and the fault is located, a trigger signal is transmitted to a disconnector corresponding to the identified fault to isolate the fault and to recover the DC connection system.

As can be seen, the calculation employs a simple process, and the directional features of the controllable current are accurate and reliable; thus, the data window can be within about 1 ms. The delay caused by communications can be considerably reduced because all relays are in the vicinity of the collector bus, and the distance between the DC/DC converter controller and the collector bus is short. The total time cost entailed by this disclosed protection method does not exceed about 10 ms.

Owing to the stability of the polarity of the steady-state current generated by the DC/DC converter, the reliability problems caused by noise, measurement error, and transient capacitance current, among others, and associated with existing DC protections do not affect the protection scheme disclosed herein. In the fault control stage, the injected current signal detected by the relay of faulty line is the sum of the currents from all DC/DC boost converters in healthy branches. Thus, any single DC/DC boosting converter failure does not lead to a failure of the protection criteria. This feature further ensures the reliability of the protection scheme disclosed herein. In the fault loop, the DC/DC converter in the fault control stage is considered as a controllable current source. Even for high-impedance faults in DC, the sensitivity of the protection disclosed here is not affected. All these features are confirmed in the simulations described below.

V. SIMULATION VERIFICATION

To verify the performance of the fault zone identification method disclosed herein, the PV DC boosting and integration system 100 shown in FIG. 1 is modeled; meanwhile, the PV-branch fault $f_1$, the collector bus fault $f_2$, and the delivery-line fault $f_3$ are performed.

Each PV unit may comprise a 250 kW centralized PV source and a DC/DC converter. All PV units are connected to a collector bus whose rated voltage is ±30 kV and is linked to a hybrid MMC which may be 10 km away. This hybrid MMC can switch off the DC fault currents from the AC grid. The sampling frequency of the protection relays is 50 kHz. The specific parameters of the DC/DC converter, DC/AC converter, and system are provided in Tables 2-4 below.

TABLE 2

| Hybrid MMC converter parameters | |
| --- | --- |
| Parameter name | Value |
| SM levels | 37 |
| SM capacitance | 1.26 mF |
| Bridge arm reactance | 160 mH |
| Substation rated capacity | 5 MVA |
| Rated DC current | 83.3 A |
| Rated AC current | 82.5 A |

TABLE 3

| DC/DC converter parameters | |
| --- | --- |
| Parameter name | Value |
| Input filter capacitor | 1500 μF |
| Output filter capacitor | 5 μF |
| Transformer ratio | 1:60 |
| Leakage inductance | 12 μH |
| Control mode | MPPT |

TABLE 4

| DC line converter parameters | |
| --- | --- |
| Parameter name | Value |
| Branch line length | 5 km |
| Transmission line length | 10 km |
| Line impedance | 0.125 Ω/km |
| Self-inductance | 0.586 mH/km |
| Mutual inductance | 0.256 mH/km |
| Capacitance to ground | 0.35 μF/km |
| Interpolar capacitance | 0.039 μF/km |

A. Verification of DC/DC Converter in the Fault Control Stage

To verify the fault control capability of the DC/DC boost converter, current outputs are simulated.

Figure 13:
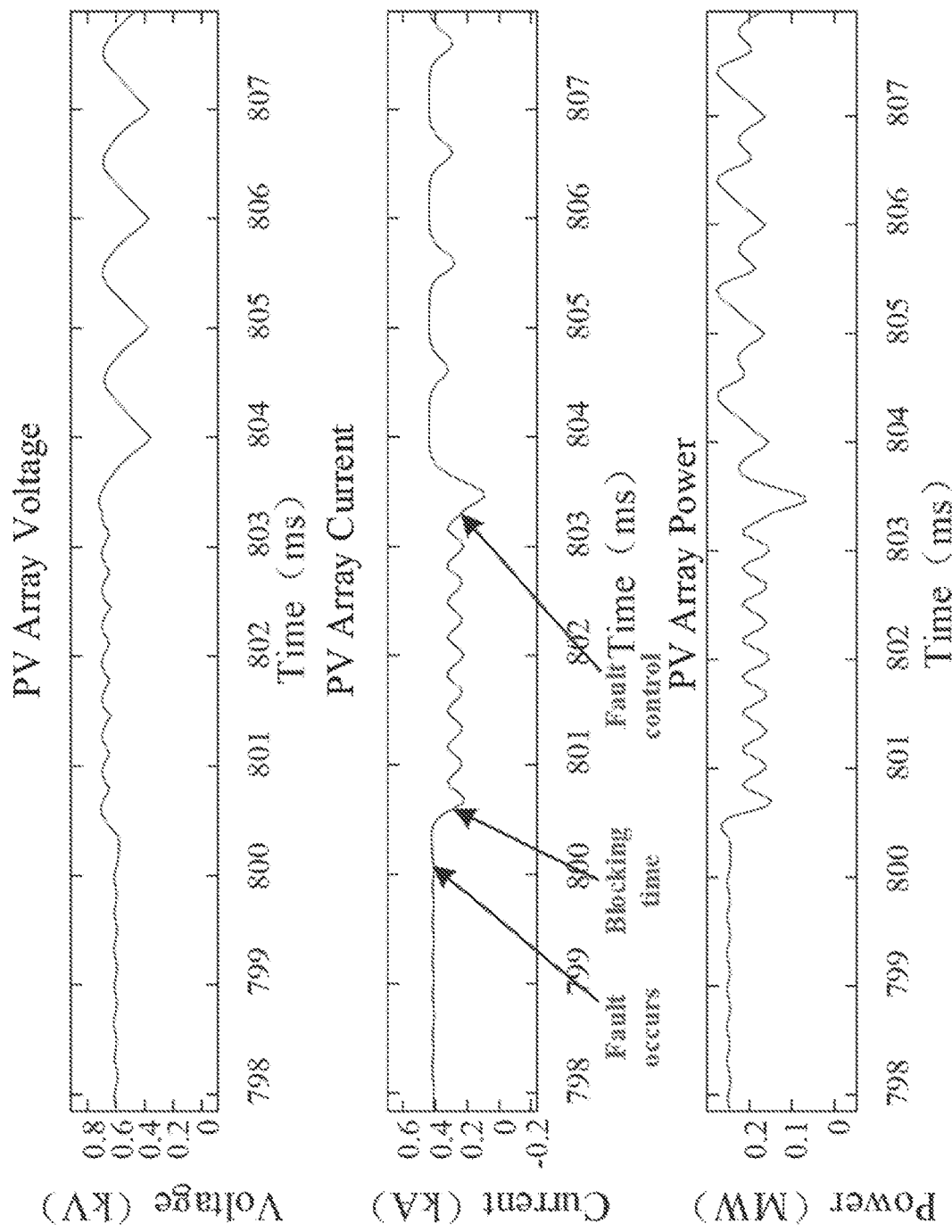
FIG. 13 shows an example simulation of PV outlet voltage, current, and power during a fault according to an embodiment of the present disclosure.

The fault $f_1$ occurs at about 800 ms of the simulation time with a transition resistance equal to 50Ω. FIG. 13 shows the PV outlet voltage, current, and power during the fault when the fault current generated by the DC/DC converter is 100% of the rated current.

As shown in FIG. 13, the PV DC/DC boosting converter is quickly blocked after the fault $f_1$ occurs. After blocking, the PV outputs an open-circuit voltage and the current drops. When the fault control is initiated, the voltage of the PV array is estimated to be linearly continuous between the open-circuit voltage and a lower certain voltage, which is basically consistent with the previous analysis. During this control process, the output power is maintained at a low and stable condition, thus, no impact on the PV arrays is observed.

Figure 14:
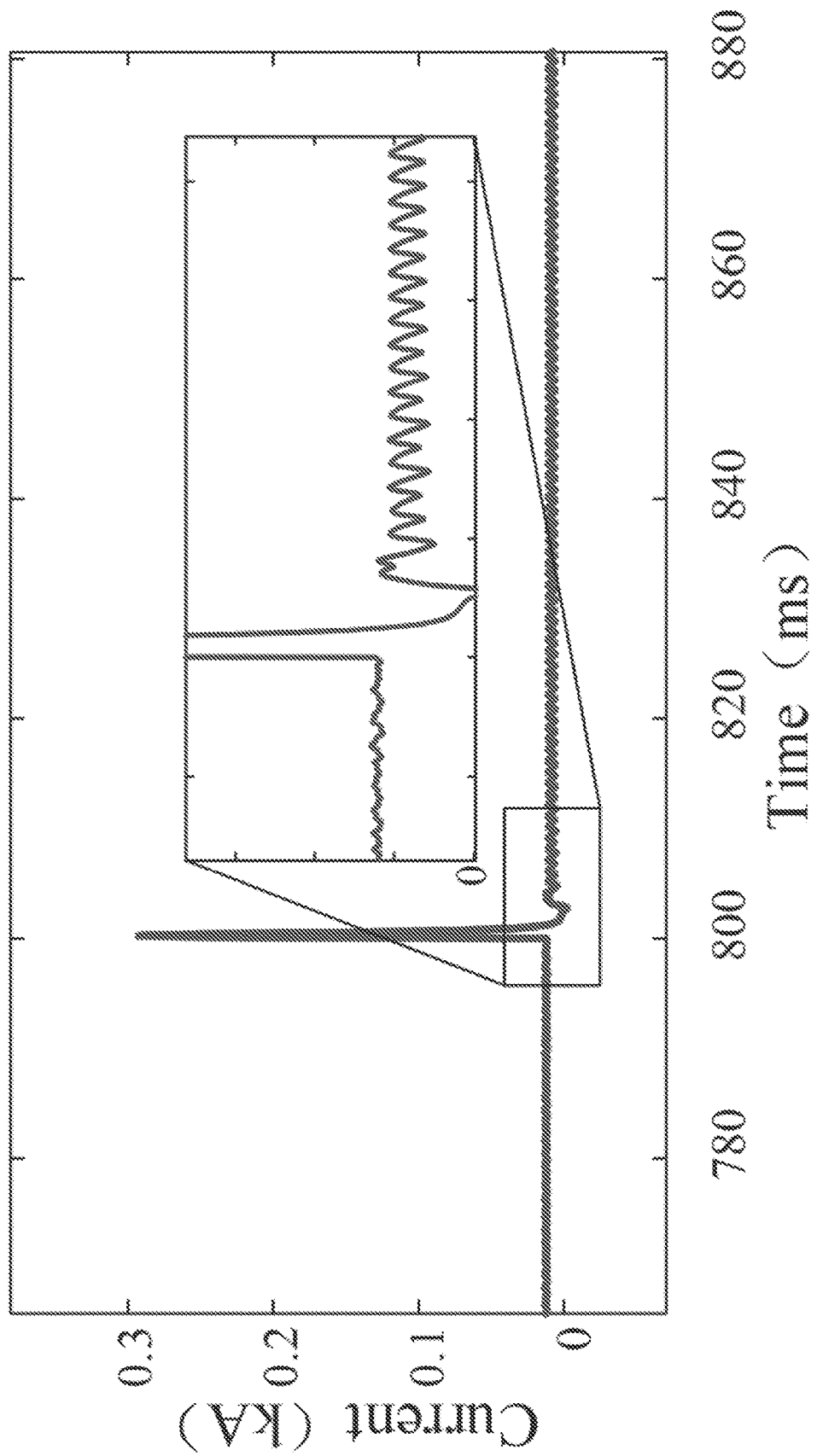
FIG. 14 shows an example simulation of a DC/DC converter output current generated at 50% of rated current of the DC/DC converter during a fault control stage according to an embodiment of the present disclosure.
Figure 15:
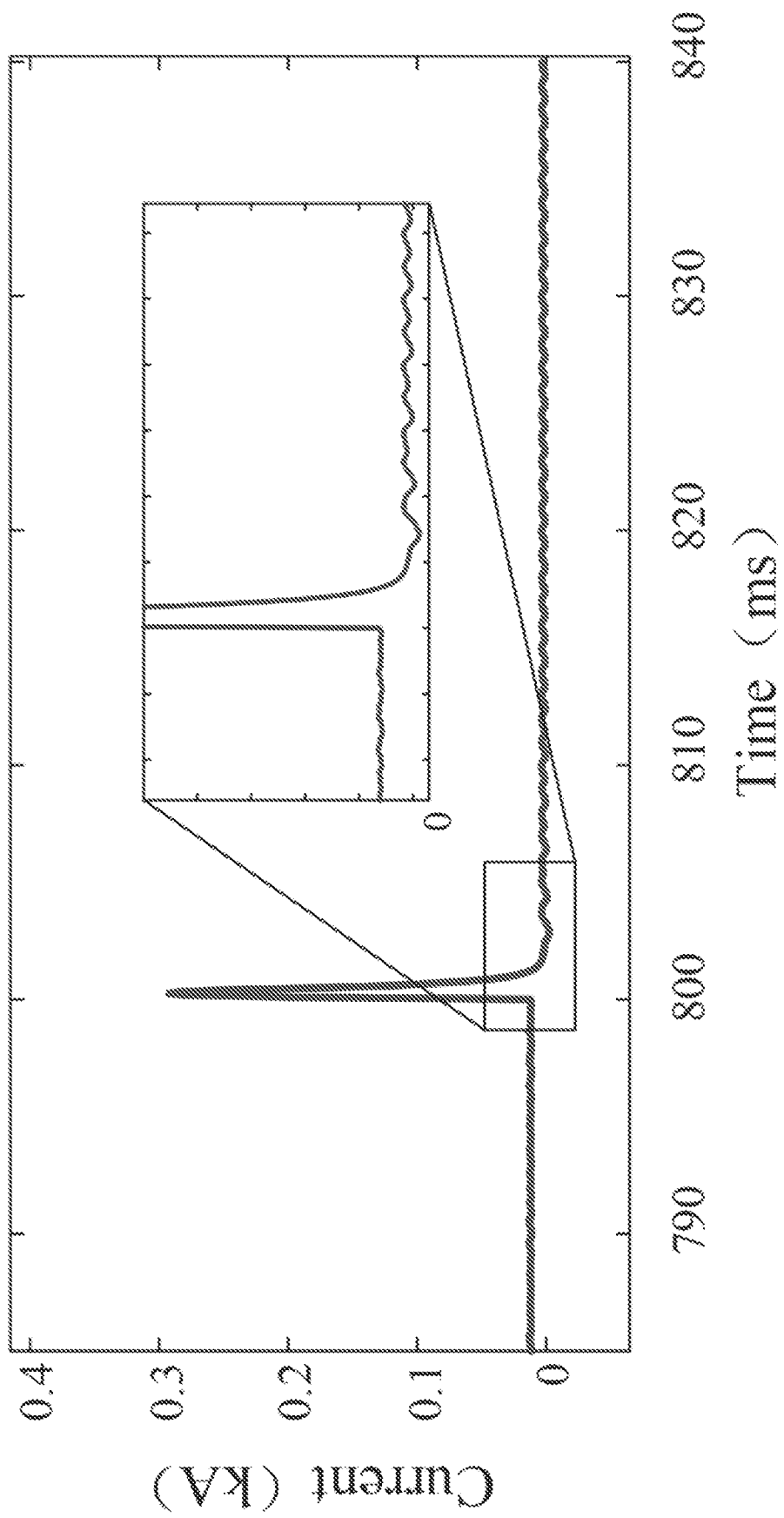
FIG. 15 shows an example simulation of a DC/DC converter output current generated at 10% of rated current of the DC/DC converter during a fault control stage according to an embodiment of the present disclosure.

To verify the capability of DC/DC converters to control the fault current, the fault current output amplitude is set at 50% and 10% of the rated current. In accordance with the equation (12), the simulation results are shown in FIGS. 14 and 15, respectively.

The output current meets the control requirements, and the current polarity response is accurate. The aforementioned simulation results prove that the DC/DC converter in the fault control stage still exhibits stability and reliability in generating post-fault current. With cost and environmental noise considered, 50% of the rated current is set in the simulation test below.

B. Fault in Photovoltaic Branches

Figure 9:
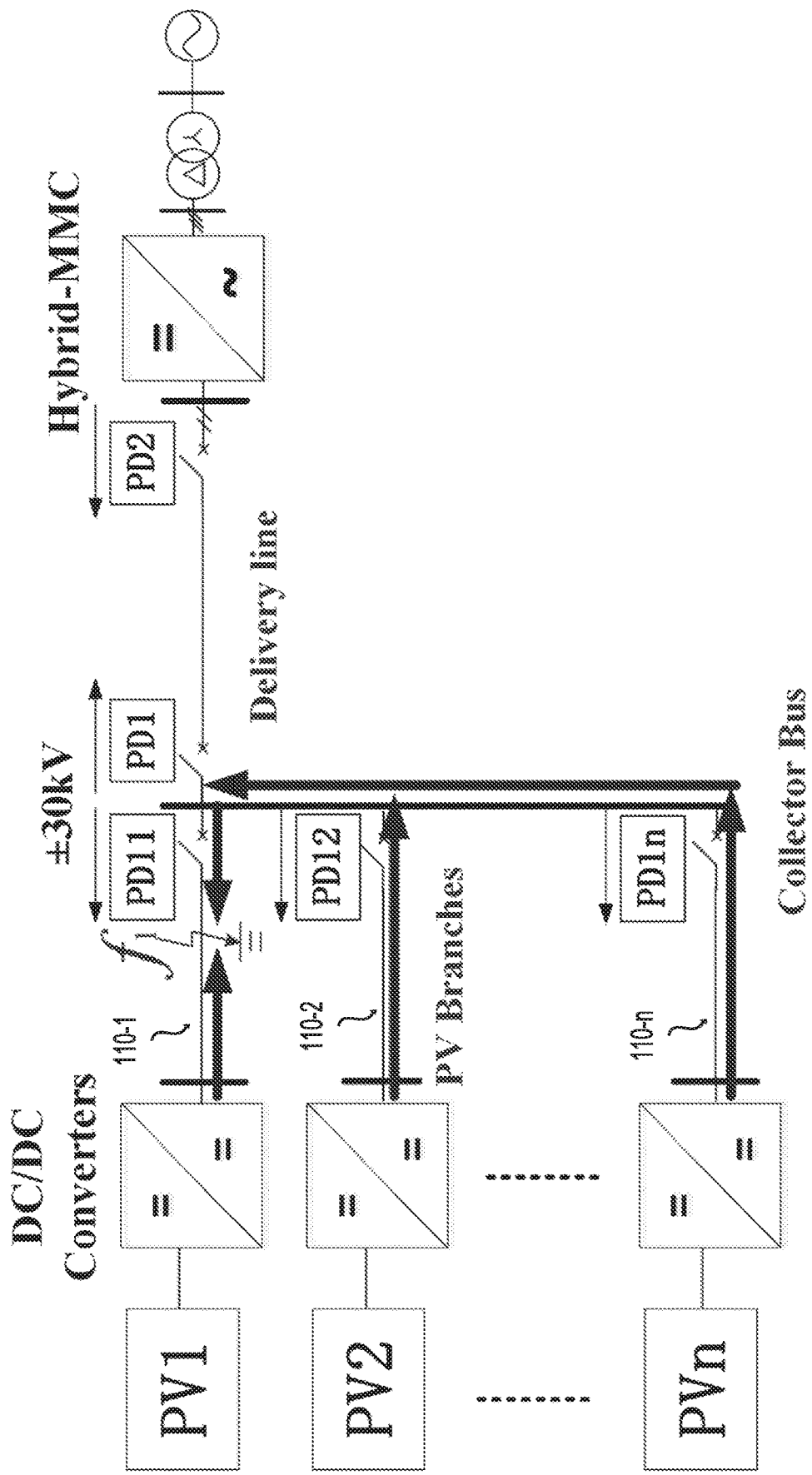
FIG. 9 shows an example fault current distribution of a flexible DC collection system when a branch fault occurs according to an embodiment of the present disclosure.
Figure 16:
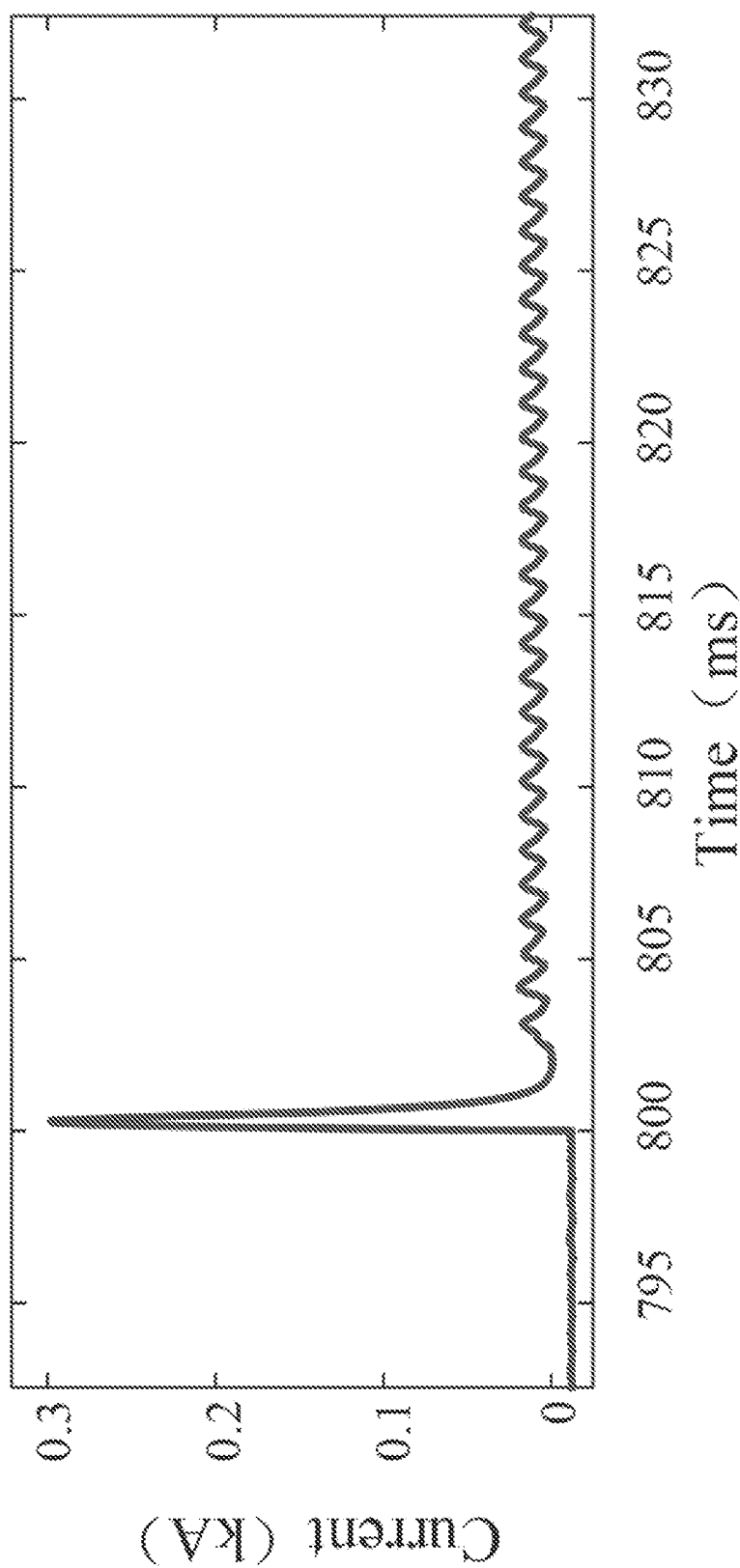
FIG. 16 shows an example simulation of the fault current of a protection relay during a branch fault according to an embodiment of the present disclosure.

As shown in FIG. 13, a bipolar short-circuit fault $f_1$ may occur in the middle of the PV collection branch at a simulation time of about 800 ms with a transition resistance equal to about 5Ω. This fault is an internal fault for the protection relay PD11 (FIG. 9). The simulation result of the current of the protection relay PD11 is shown in FIG. 16

Figure 17:
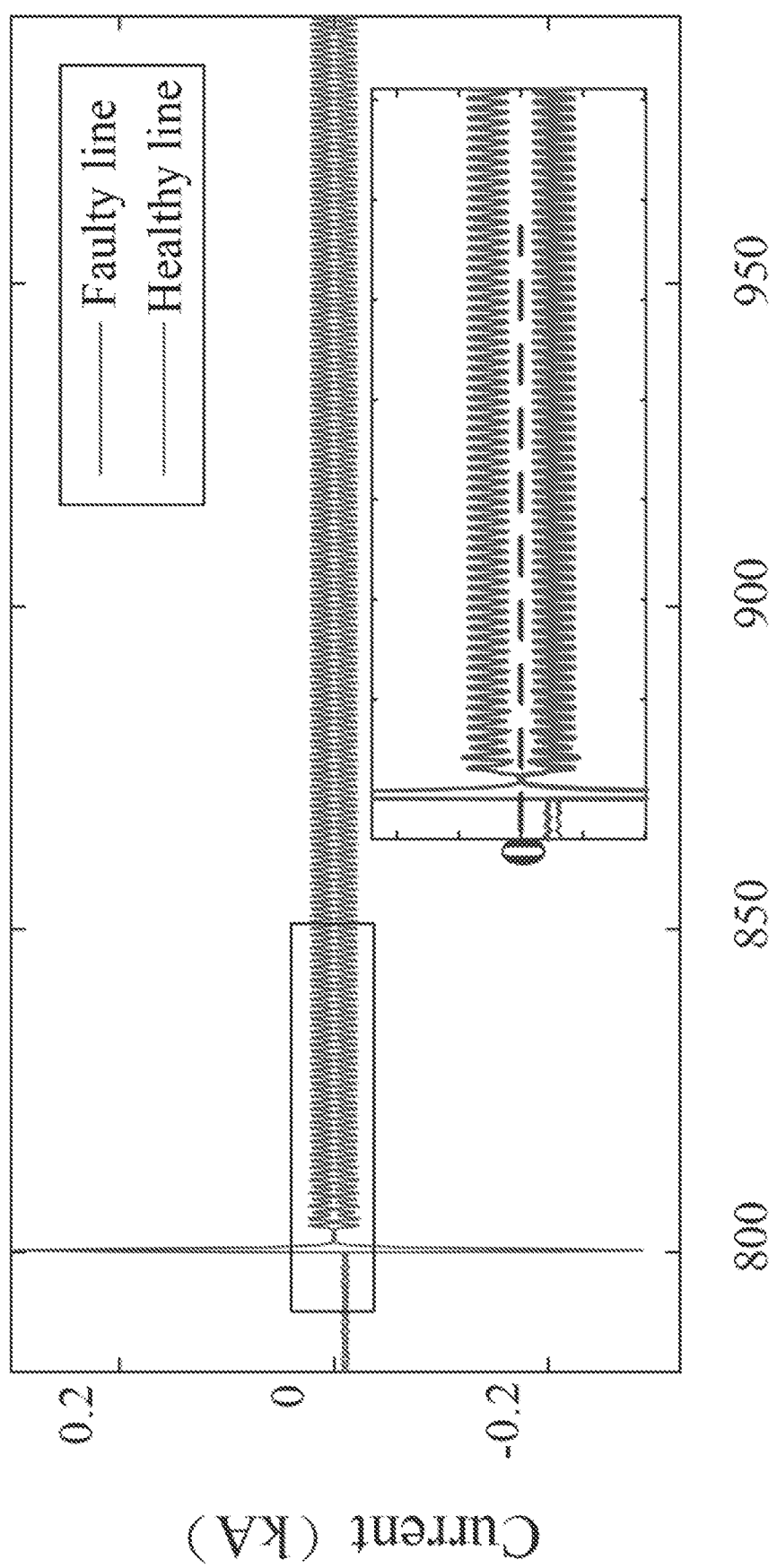
FIG. 17 shows an example comparison of instantaneous fault currents between a faulty branch and a healthy branch according to an embodiment of the present disclosure.
Figure 18:
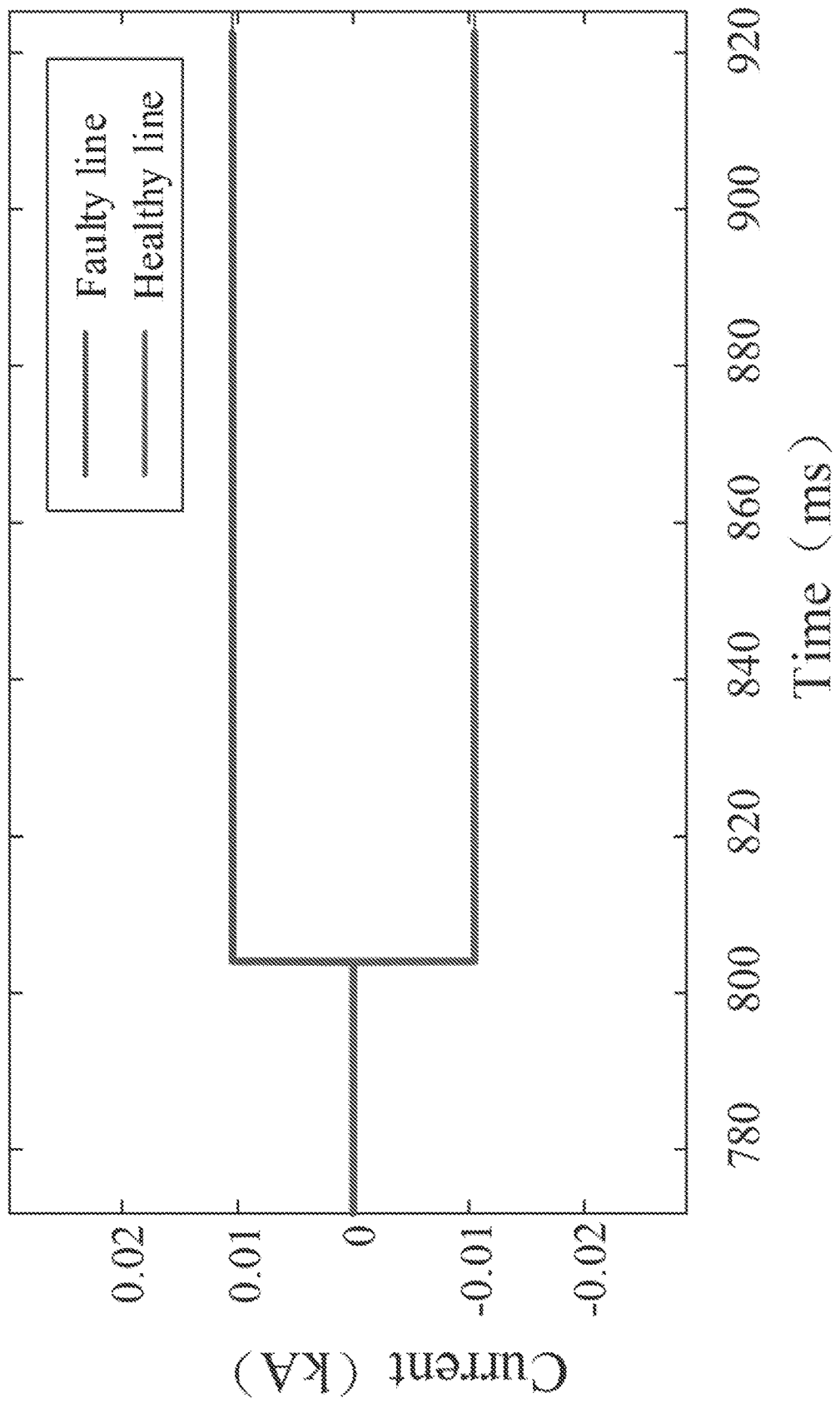
FIG. 18 shows an example comparison of root mean square (RMS) fault currents between a faulty branch and a healthy branch according to an embodiment of the present disclosure.

The protection relays and the controller of the DC/DC converters shift into the fault control state after the start criterion is satisfied. MMC and DC/DC converters are blocked continuously in the subsequent 0.3 ms. Fault current reduction from a peak value to about 0 may require about 3.4 ms. The DC/DC converters and protection relays are then started. After the start-up of the fault control stage, the protection relays can recognize the fault zone within 1 ms. The entire process may be completed in about 4.7 ms after the fault occurs. Comparison of the instantaneous and the RMS value of the faulty branch and the healthy branch current is presented in FIGS. 17-18.

Figure 19:
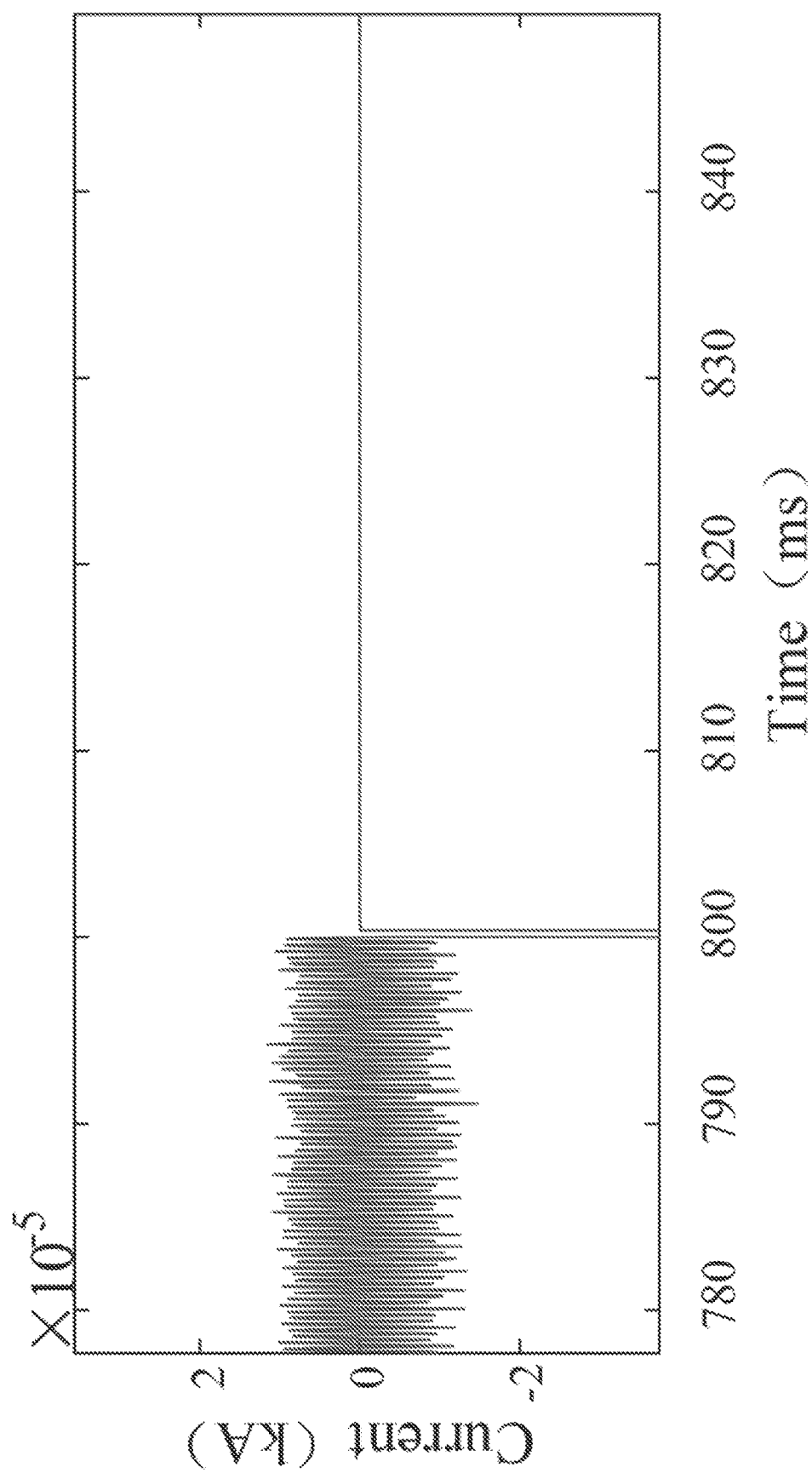
FIG. 19 shows an example simulation of the differential current value when the protection criterion of the collector bus is not met according to an embodiment of the present disclosure.

These simulations prove that when a fault occurs in a PV collection branch, the faulty branch can be quickly and reliably located using the disclosed identification techniques. In accordance with the equation (16), the differential current value when the protection criterion of the collector bus is not met is shown in FIG. 19.

C. Internal Fault of Collector Bus and Delivery Line

Figure 20:
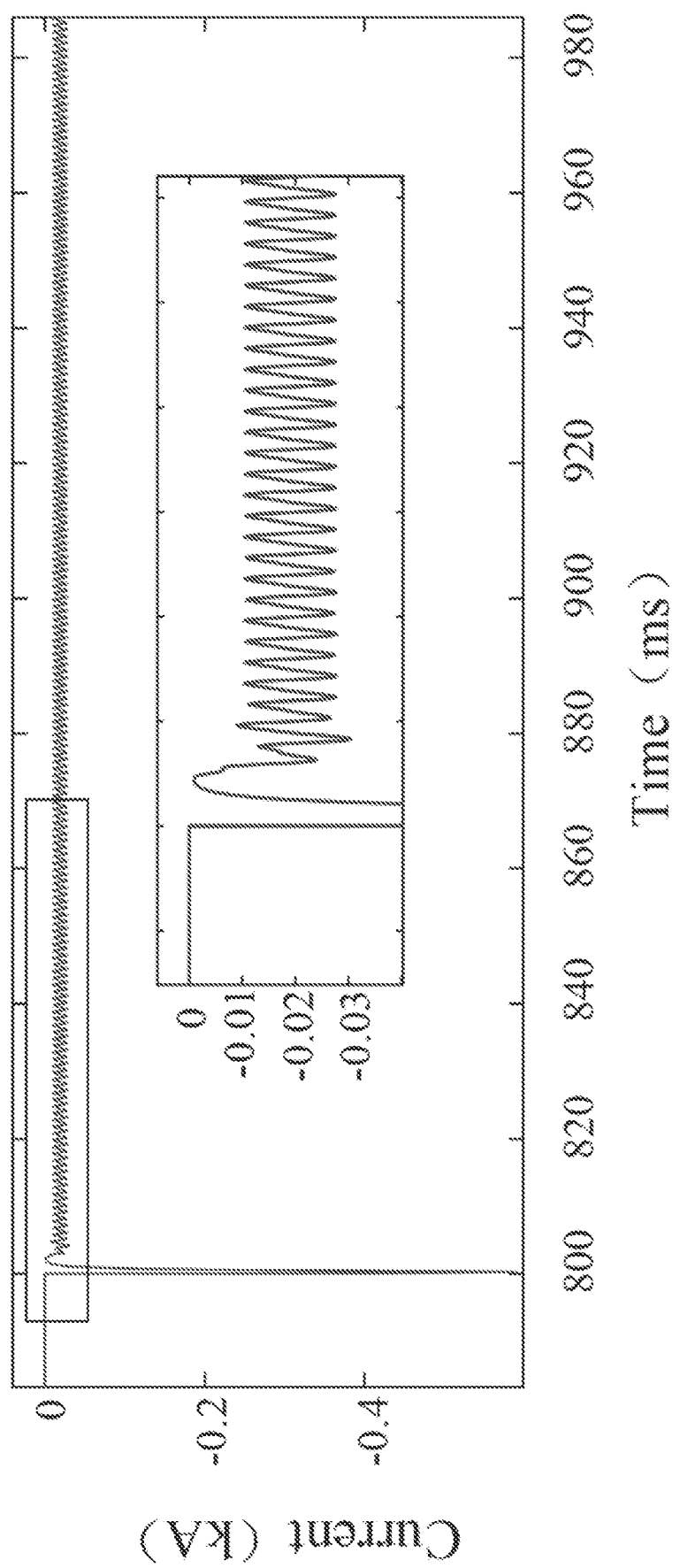
FIG. 20 shows an example simulation of instantaneous value of bus differential current according to an embodiment of the present disclosure.
Figure 21:
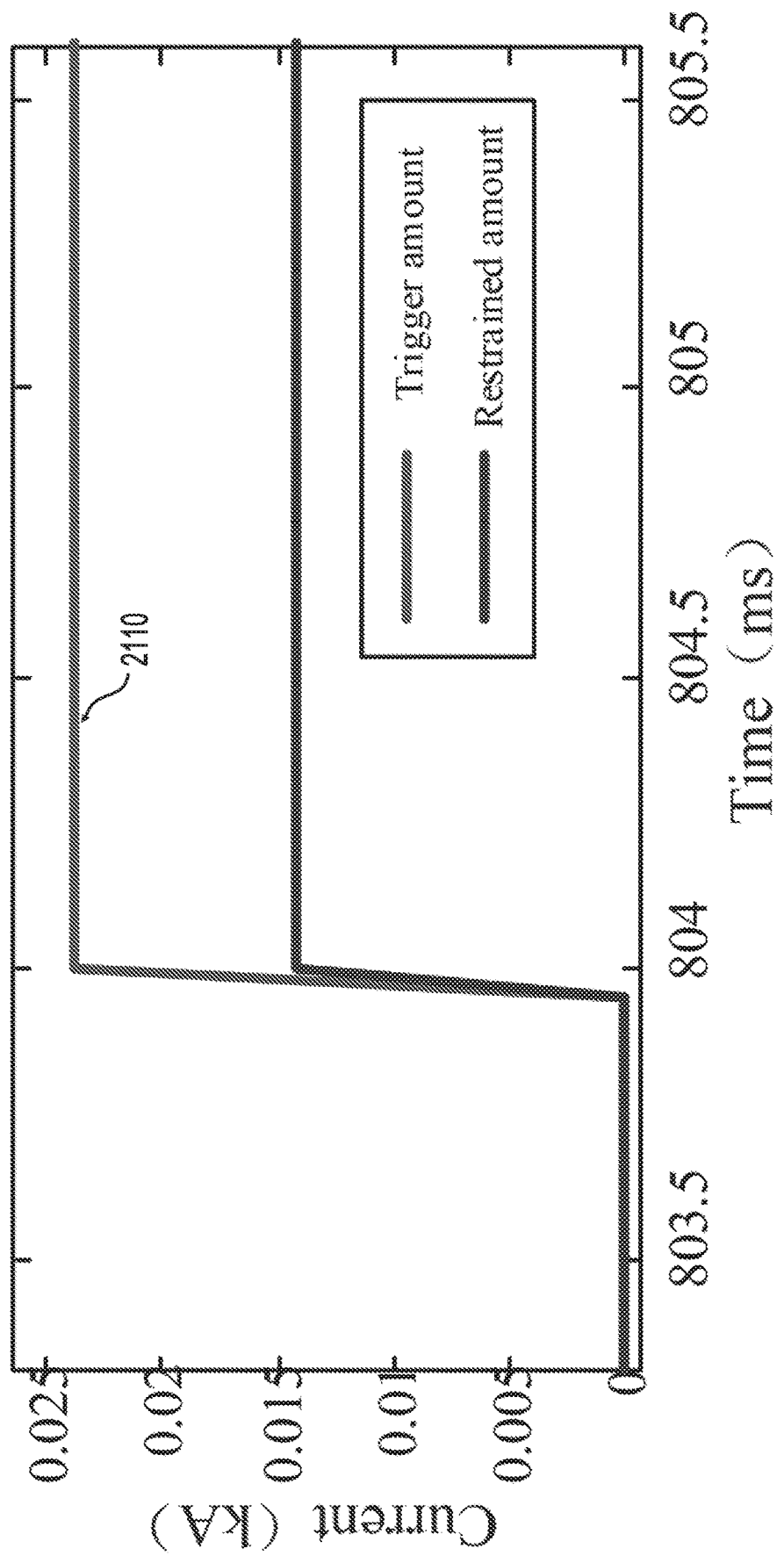
FIG. 21 shows an example simulation of trigger amount and restrained amount of bus percentage-restrained criterion according to an embodiment of the present disclosure.

The analysis in Section IV indicates that when a fault occurs in the collector bus, the fault control of the DC/DC boosting converter is basically the same as that under other conditions. The faulty section can be identified using the differential criterion in the equation (16), in which $K_{res}$ is set to 0.3. The simulation result of the bus differential current is shown in FIGS. 20 and 21.

At this stage, the currents of all healthy branches flow into the collector bus. The differential current, which is about 23 Ampere as shown by the arrow 2110 in FIG. 21, is the sum of the currents of the healthy branches. The bus fault can be accurately identified.

For the relay PD1 of the delivery line, the fault current of the external fault cannot be detected at the fault control stage because the blocked MMC extinguishes the fault current from the AC side. If it is an internal fault for the relay PD1, the fault current gathered from all PV branches is detected by the relay PD1 whose fault current is as shown in FIG. 22.

Figure 22:
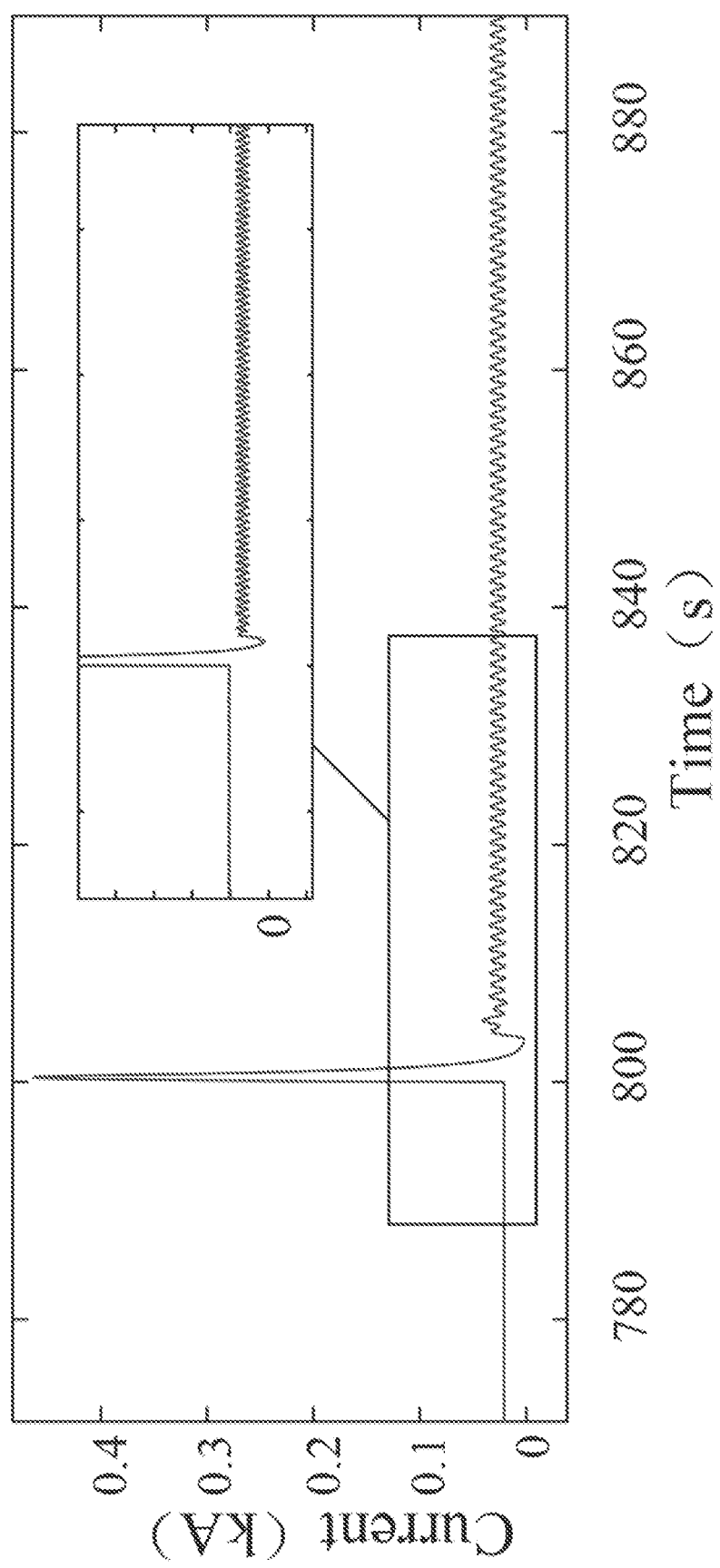
FIG. 22 shows an example simulation of fault current at a protection relay on the delivery line when an internal fault occurs according to an embodiment of the present disclosure.

The controlled injected signal detected by the relay PD1 has a constant amplitude and constant polarity as shown in FIG. 22. The polarity of the controlled current remains positive. In accordance with the equation (15), the internal fault is accurately identified by the relay PD1 similar to the relay PD11.

Figure 23:
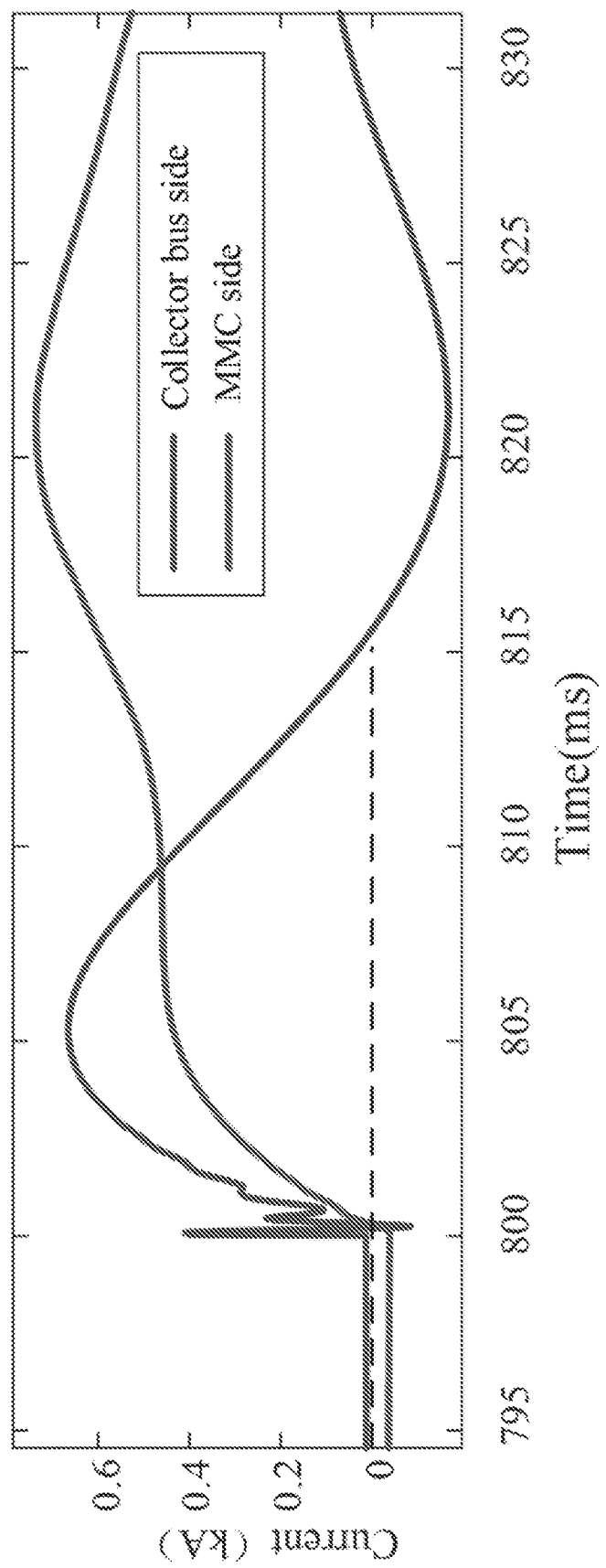
FIG. 23 shows an example simulation of transient fault current of the delivery line when an internal fault occurs according to an embodiment of the present disclosure.
Figure 24:
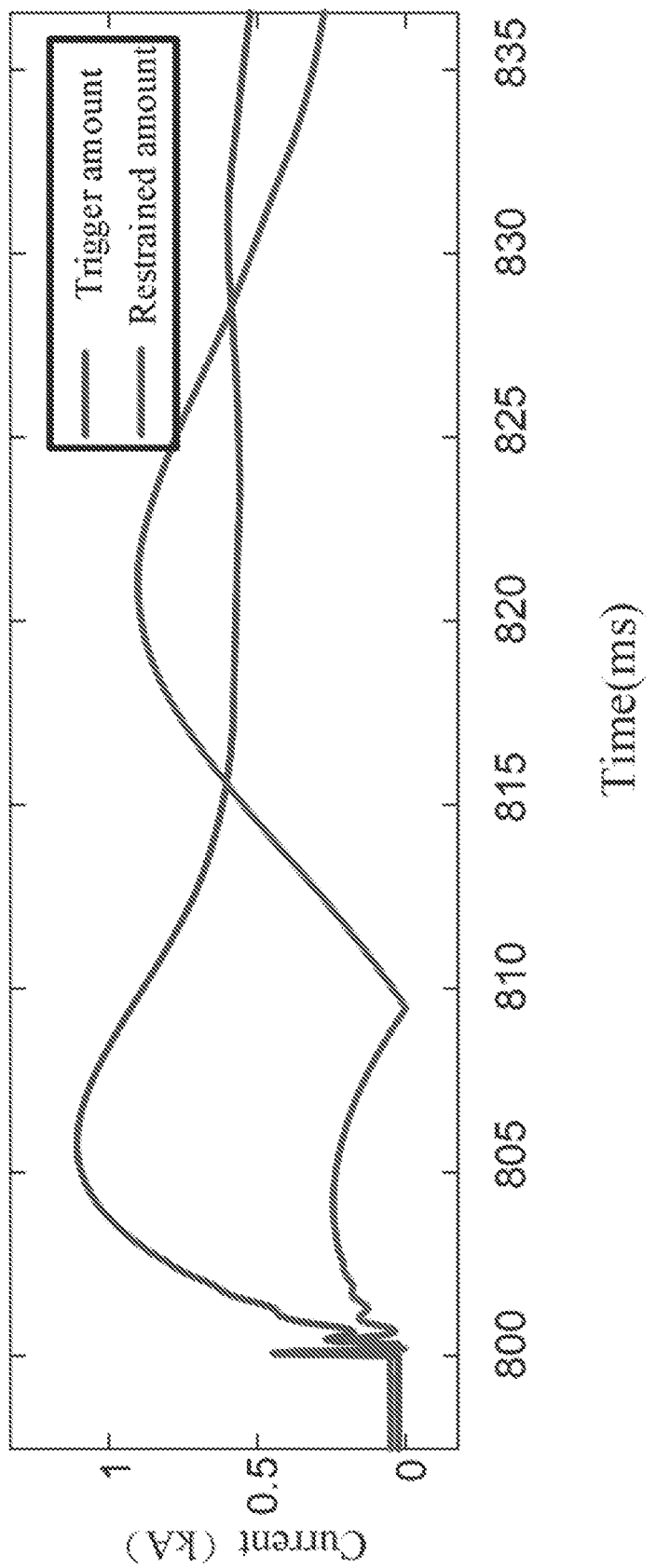
FIG. 24 shows an example simulation of differential criterion when an internal fault occurs on the delivery line according to an embodiment of the present disclosure.

D. Comparison Between Existing Protection and Disclosed Protection, and Sensitivity Analysis of the Disclosed Protection Existing protection methods, which are based on fault current before blocking MMC, is compared with the protection method disclosed herein. For example, a pole-to-pole fault with a transition resistance equal to 5Ω may occur at $f_3$. The transient current measured by both sides of the delivery line is simulated, as shown in FIG. 23. The trigger amount and the restrained amount of the differential criterion are shown in FIG. 24.

As shown in FIG. 23, in the transient process, the fault current rises rapidly because the MMC and all DC/DC converters have large capacitors. The instantaneous value of the fault current may rise up to 20 times the rated current within 0.5 ms. In some fault conditions, the duration for the fault current rise may be even shorter. The existing or existing protection methods, which require a sufficient time window length to operate accurately, can lose reliability. The fault current also exhibits high-order oscillation, and the current magnitude is no longer proportional to fault distance. The protections of different zones are unable to cooperate with one another. Thus, protection based on current abrupt direction may not function properly. As shown in FIG. 24, the differential pilot protection based on the instantaneous value of the fault current may also function improperly. Aside from these reliability problems, the action time of existing protection is also limited by the blocking time of MMC. For example, in an unfavorable electromagnetic environment, the performance of these existing protection schemes can get even worse.

Owing to the stability of the polarity of the steady-state current generated by the DC/DC converter, the faulty zone identification method disclosed herein can show improved reliability, even under some extreme conditions such as high-impedance grounding faults or a high level of noise.

The effects of signal noise on the disclosed fault zone identification method are investigated. In an example, the pole-to-pole fault with a transition resistance equal to 50 occurs at $f_3$. At the fault control stage, the transient current samples measured by the protection relays (e.g., PD11, PD12 . . . PD1n, and PD1) are corrupted by white Gaussian noise at different levels. For example, the simulation results of fault current for PD11 and PD1 with different signal-to-noise ratios are presented in FIGS. 25 and 26, respectively.

Figure 25:
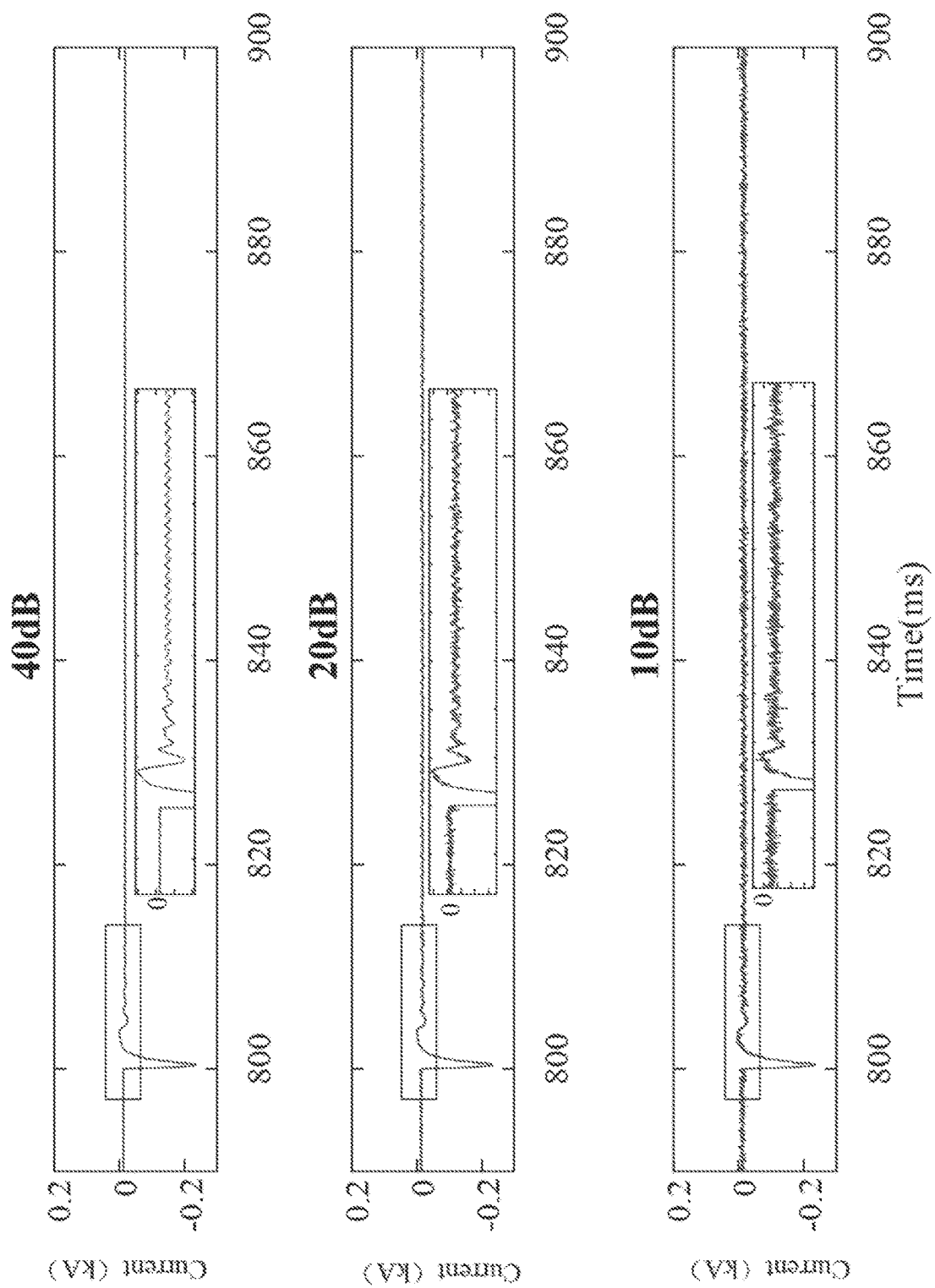
FIG. 25 shows an example simulation of fault current of a protection relay under various noise conditions for a delivery line fault according to an embodiment of the present disclosure.
Figure 26:
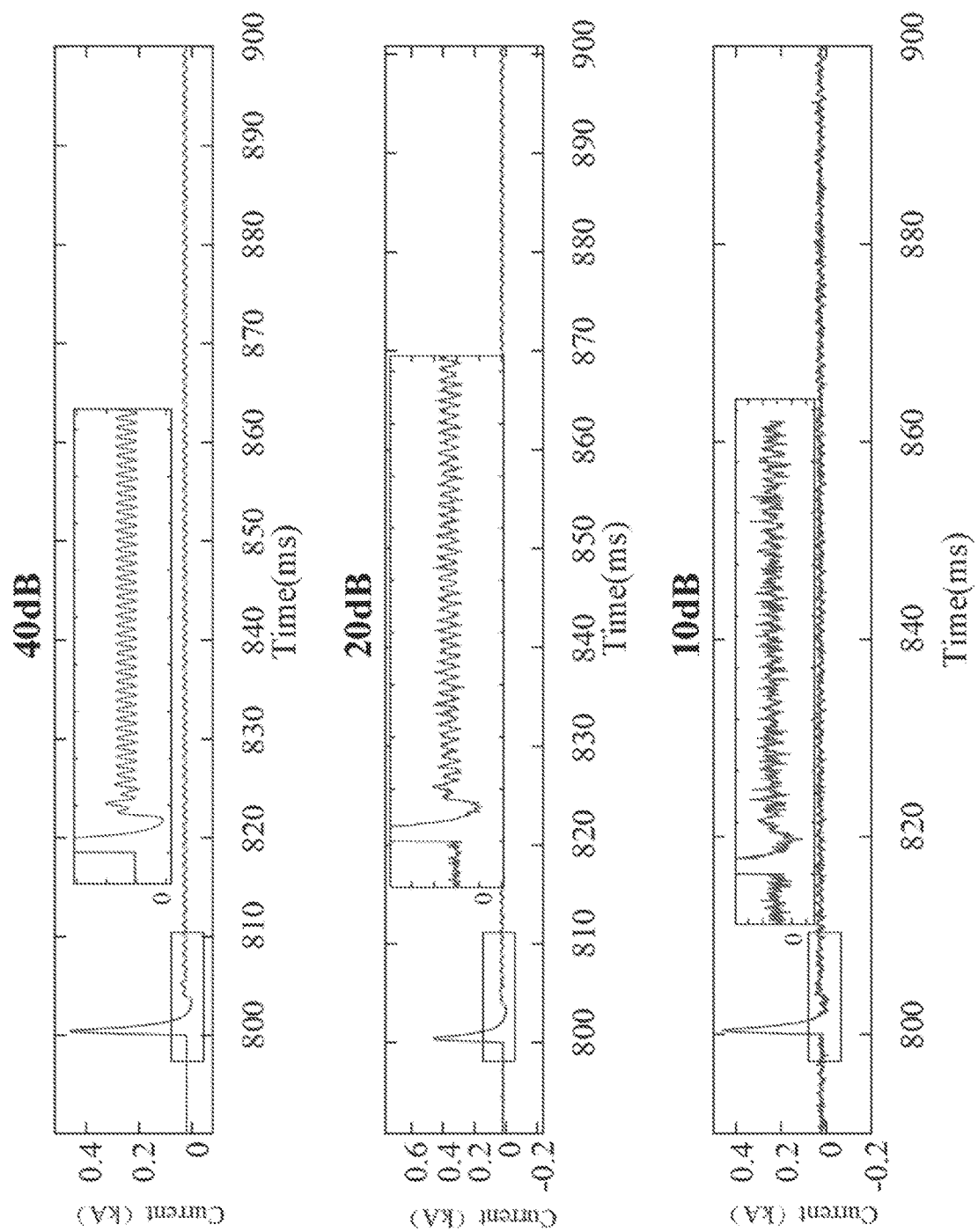
FIG. 26 shows an example simulation of fault current of another protection relay under various noise conditions for the delivery line fault according to an embodiment of the present disclosure.

For the protection relay PD11, the fault f is an external fault. As shown in FIG. 25, the RMS value of the measured fault current remains negative. As shown in FIG. 26, for the protection relay PD1, the RMS value of the measured fault current remains positive. Depending on these, an internal fault of PD1 can be recognized. As shown in FIGS. 25 and 26, on the basis of the simulation results, and after the random increments at various frequencies are added to the simulated waveforms, the fault current curve is no longer smooth, but the polarity of the steady-state current provided by the DC/DC converter is unaffected. The direction of the fault current can still be accurately identified.

Different levels of fault grounding resistance are simulated to test performance of the disclosed protection under effect of fault grounding resistance. Various fault locations are also simulated. The simulation results are listed in Table 5.

TABLE 5

Protection detecting results of various section faults

| | Fault resistance (KΩ) | | | Distance to the relay (km) | | |
|---|---|---|---|---|---|---|
| | 5 | 50 | 200 | 0.5 | 2 | 5 |
| PV Branch Fault | 4.7 ms | 2.8 ms | 1.9 ms | 4.7 ms | / | / |
| Collector Bus Fault | 4.7 ms | 2.8 ms | 1.9 ms | / | / | / |
| Delivery Line Fault | 4.7 ms | 2.8 ms | 1.9 ms | 4.7 ms | 4.6 ms | 4.4 ms |

The period from the time when the DC/DC converters are blocked to the time when the system fault current is extinguished is determined by the resistance in the fault loop. As shown in Table 5, as the fault resistance increases, the time constant decreases, resulting in reduced time costs at the blocked stage. Consequently, the duration for fault zone identification is reduced.

In summary, the simulation results prove that the DC/DC converter can stably output fault current at the fault control stage without any impact on the system. On this basis, a directional protection strategy is disclosed herein which detects the faulty zone by identifying the measured currents of the protection relays, which connect to the collector bus. The disclosed protection approach can be completed within 5 ms and is not affected by transition resistance.

In this disclosure, a protection scheme combined with the active control of the DC/DC converter is disclosed, which can accurately identify a fault section with high speed and high reliability. This scheme can solve the issues associated with existing protection schemes, such as the inadequacy of effective and reliable fault information for faulty region identification that uses the instantaneous value of transient current.

In this disclosure, the topological characteristics of a PV flexible DC integration system is analyzed, and a fault control method based on the IBFBC structure of the DC/DC converter is provided. This approach exhibits a potential for outputting controllable injected signal with stable polarity by the DC/DC converter after the MMC is blocked.

A fault region recognition method for the PV branch protective zone, the collector bus protective zone, and the DC delivery line protective zone is disclosed, depending on polarity identification and the sum of the currents generated by the DC/DC converters in the fault control stage.

Simulation results indicate that protective logic disclosed herein is correct and that a fault zone can be determined with high reliability within 5 ms after the fault occurs. Compared with other existing schemes, the disclosed approach performs better against transition resistance and noise. Moreover, no additional device is needed.

VI. TECHNICAL IMPLEMENTATION OF THE DISCLOSED METHOD

Figure 27:
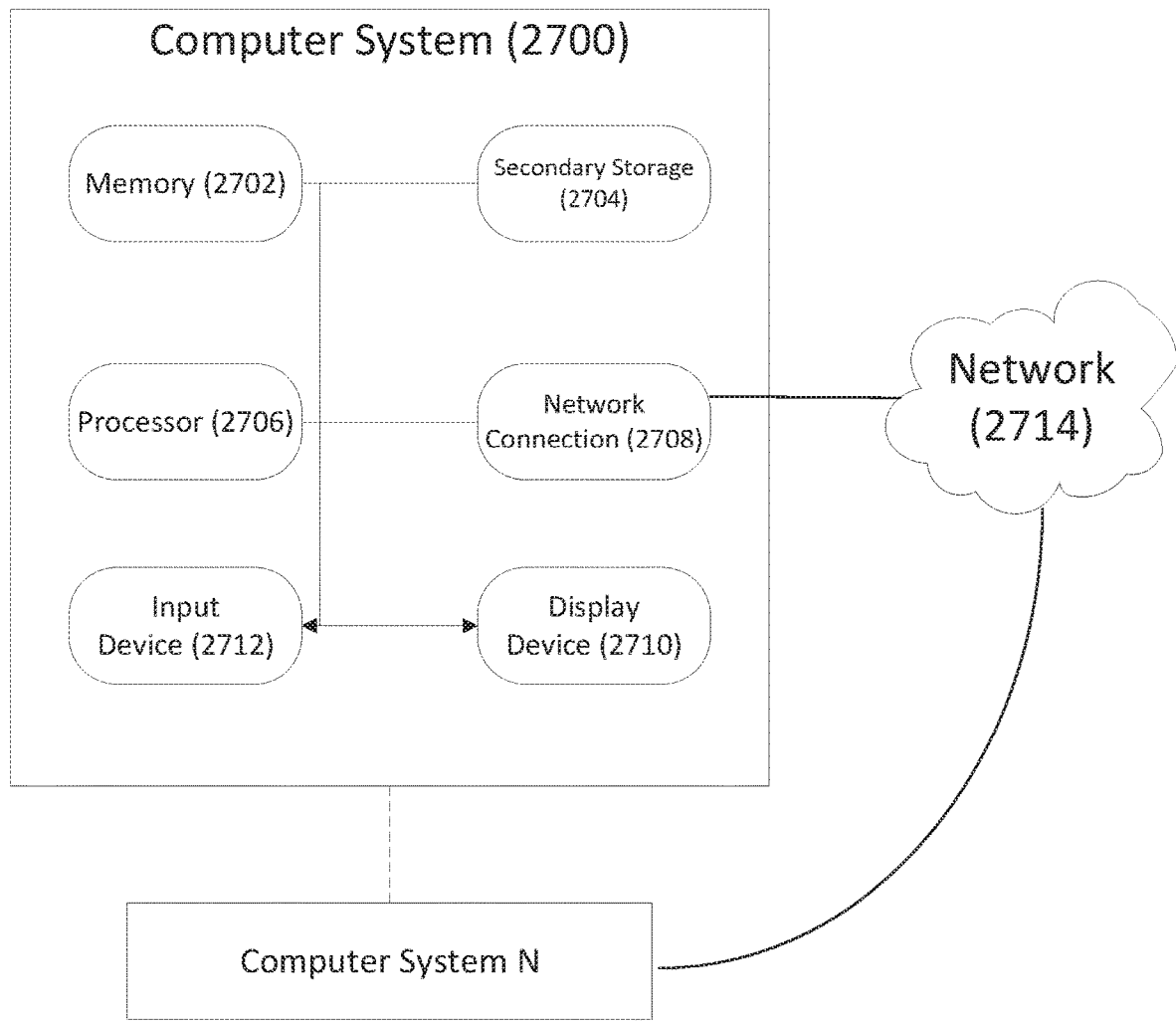
FIG. 27 shows a computer system that may implement a disclosed protection method according to an embodiment of the present disclosure.

In some embodiments, the protection system disclosed herein may comprise a computer system to implement the disclosed protection method. The computer system may act as a controller to control executions of, for example, the simulation of the DC/DC converter fault current shown in FIG. 5, the flow chart of the protection method 1200 in FIG. 12, and various simulations shown in FIGS. 13-26. FIG. 27 illustrates an exemplary computer system 2700 that can be used to implement the disclosed method partially or wholly. The computer system 2700, or other computer systems similarly configured, may include and execute one or more subsystem components to perform functions described herein, including the steps/blocks of various flow processes, measurements and/or analyses described above. Likewise, a mobile device, a cell phone, a smartphone, a laptop, a desktop, a notebook, a tablet, a wearable device, a server, etc., which includes some of the same components of the computer system 2700, may run an application (or software) and perform the steps and functionalities described above. The computer system 2700 may connect to a network 2714, e.g., Internet, or other network, to receive inquiries, obtain data, and/or transmit information as described above.

The computer system 2700 typically includes a memory 2702, a secondary storage device 2704, and a processor 2706. The computer system 2700 may also include a plurality of processors 2706 and be configured as a plurality of, e.g., bladed servers, or other known server configurations. The computer system 2700 may also include a network connection device 2708, a display device 2710, and an input device 2712.

The memory 2702 may include RAM or similar types of memory, and it may store one or more applications for execution by the processor 2706. The secondary storage device 2704 may include a hard disk drive, floppy disk drive, CD-ROM drive, or other types of non-volatile data storage. The processor 2706 executes the application(s), such as those described herein, which are stored in the memory 2702 or secondary storage 2704, or received from the Internet or other network 2714. The processing by processor 2706 may be implemented in software, such as software modules, for execution by computers or other machines. These applications preferably include instructions executable to perform the system and subsystem component functions and methods described above and illustrated in the Figs. herein. The applications preferably provide graphical user interfaces (GUIs) through which users may view and interact with the subsystem components.

The computer system 2700 may store one or more database structures in the secondary storage 2704, for example, for storing and maintaining the information/data necessary to perform the above-described functions. Alternatively, such information/data may be in storage devices separate from these components.

Also, as noted, the processor 2706 may execute one or more software applications to provide the functions described in this specification, specifically to execute and perform the steps and functions in the process flows, measurements and/or analyses described above. The GUIs may be formatted, for example, as web pages in HyperText Markup Language (HTML), Extensible Markup Language (XML) or in any other suitable form for presentation on a display device depending upon applications used by users to interact with the computer system 2700.

The input device 2712 may include any device for entering information into the computer system 2700, such as a touch-screen, keyboard, mouse, cursor-control device, microphone, digital camera, video recorder or camcorder. The input and output device 2712 may be used to enter information into GUIs during performance of the methods described above. The display device 2710 may include any type of device for presenting visual information such as, for example, a computer monitor or flat-screen display (or mobile device screen). The display device 2710 may display the GUIs and/or output from sub-system components (or software).

Examples of the computer system 2700 include dedicated server computers, such as bladed servers, personal computers, laptop computers, notebook computers, palm top computers, network computers, mobile devices, or any processor-controlled device capable of executing a web browser or other type of application for interacting with the system.

Although only one computer system 2700 is shown in detail, the computer system 2700 may use multiple computer systems or servers as necessary or desired to support the users and may also use back-up or redundant servers to prevent network downtime in the event of a failure of a particular server. In addition, although the computer system 2700 is depicted with various components, one skilled in the art will appreciate that the computer system 2700 can contain additional or different components. In addition, although aspects of an implementation consistent with the above are described as being stored in a memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling the computer system 2700, to perform a particular method, such as methods described above.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

What is claimed is:

1. An active control-based protection system for a flexible direct current (DC) connection system of a photovoltaic (PV) plant, wherein the flexible DC connection system comprises:
   a plurality of PV arrays;
   a plurality of PV connection branches;
   a plurality of DC/DC converters, each DC/DC converter configured to connect one of the plurality of PV arrays to one of the plurality PV connection branches;
   a collector bus configured to connect to each of the plurality of PV connection branches;
   a delivery line connected to the collector bus;
   a plurality of connection branch protection relays, each connection branch protection relay positioned in one of the plurality of PV connection branches and connected to the collector bus;
   a delivery line protection relay positioned in the delivery line and connected to the collector bus;
   a DC/alternating current (AC) converter positioned in the delivery line and configured to connect the flexible DC connection system to an AC power grid; and
   a plurality of disconnectors, each disconnector positioned in one of the plurality of PV connection branches and disposed between a corresponding connection branch protection relay and the collector bus;
   the active control-based protection system comprising a controller in signal communication with the flexible DC connection system, the controller configured to:
   monitor and measure an output current value of each DC/DC converter;
   determine whether the output current value is greater than a self-protection current threshold of the DC/DC converter;
   in response to detecting the output current value being greater than the self-protection current threshold, determine that a fault has occurred;
   transmit a blocking signal to the plurality of DC/DC converters and the DC/AC converter to block the plurality of DC/DC converters and the DC/AC converter;
   determine whether the output current value is reduced to be within a first threshold range of zero, the first threshold range being from about zero to about 0.05 times a rated current value of the DC/DC converter;
   in response to determining the output current value is reduced to be within the first threshold range of zero, actively initiate a fault control of each DC/DC converter to generate by each DC/DC converter a controllable injected signal, wherein the controllable injected signal is a low-amplitude and polarity-stable current generated depending on output characteristics of PV arrays, an input voltage of each DC/DC converter continuously changes between an open-circuit voltage and a lower voltage, a duty cycle of each DC/DC converter is modified to be below about 0.5, and the input voltage is an output voltage of a PV array connected to each corresponding DC/DC converter;
   sum the controllable injected signal detected by each collection branch protection relay and the delivery line protection relay to obtain a injected signal sum, wherein the controllable injected signal detected by each collection branch protection relay and the delivery line protection relay is an average current over a predetermined period of time;

determine whether the injected signal sum is within a second threshold range of zero, the second threshold range being from about zero to a restrained amount;

in response to determining that the injected signal sum is not within the second threshold range of zero, identify the fault to have occurred in the collector bus, wherein a protection criterion for the collector bus is determined to be met and the protection criterion for the collector bus is a differential protection criterion;

in response to determining that the injected signal sum is within the second threshold range of zero, identify the fault to have occurred in a PV collection branch if a direction of the controllable injected signal detected by the collection branch protection relay of that PV collection branch is consistent with a protection reference direction of that collection branch protection relay, wherein a protection criterion of that PV collection branch is determined to be met;

in response to determining that the injected signal sum is within the second threshold range of zero, identify the fault to have occurred in the delivery line if a direction of the controllable injected signal detected by the delivery line protection relay is consistent with a protection reference direction of the delivery line protection relay, wherein a protection criterion of the delivery line is determined to be met; and transmit a trigger signal to a disconnector corresponding to the identified fault to isolate the fault and to recover the DC connection system.

2. An active control-based protection method for a flexible direct current (DC) connection system of a photovoltaic (PV) plant, wherein the flexible DC connection system comprises:

a plurality of PV arrays;

a plurality of PV connection branches;

a plurality of DC/DC converters, each DC/DC converter configured to connect one of the plurality of PV arrays to one of the plurality PV connection branches;

a collector bus configured to connect to each of the plurality of PV connection branches;

a delivery line connected to the collector bus;

a plurality of connection branch protection relays, each connection branch protection relay positioned in one of the plurality of PV connection branches and connected to the collector bus;

a delivery line protection relay positioned in the delivery line and connected to the collector bus;

a DC/alternating current (AC) converter positioned in the delivery line and configured to connect the flexible DC connection system to an AC power grid;

a plurality of disconnectors, each disconnector positioned in one of the plurality of PV connection branches and disposed between a corresponding connection branch protection relay and the collector bus; and a controller in signal communication with the flexible DC connection system, the method comprising:

monitoring and measuring, by the controller, an output current value of each DC/DC converter;

determining, by the controller, whether the output current value is greater than a self-protection current threshold of the DC/DC converter;

in response to detecting the output current value being greater than the self-protection current threshold, determining, by the controller, that a fault has occurred;

transmitting, by the controller, a blocking signal to the plurality of DC/DC converters and the DC/AC converter to block the plurality of DC/DC converters and the DC/AC converter;

determining, by the controller, whether the output current value is reduced to be within a first threshold range of zero, the first threshold range being from about zero to about 0.05 times a rated current value of the DC/DC converter;

in response to determining the output current value is reduced to be within the first threshold range of zero, actively initiating, by the controller, a fault control of each DC/DC converter to generate by each DC/DC converter a controllable injected signal, wherein the controllable injected signal is a low-amplitude and polarity-stable current generated depending on output characteristics of PV arrays, an input voltage of each DC/DC converter continuously changes between an open-circuit voltage and a lower voltage, a duty cycle of each DC/DC converter is modified to be below about 0.5, and the input voltage is an output voltage of a PV array connected to each corresponding DC/DC converter;

summing, by the controller, the controllable injected signal detected by each collection branch protection relay and the delivery line protection relay to obtain a injected signal sum, wherein the controllable injected signal detected by each collection branch protection relay and the delivery line protection relay is an average current over a predetermined period of time;

determining, by the controller, whether the injected signal sum is within a second threshold range of zero, the second threshold range being from about zero to a restrained amount;

in response to determining that the injected signal sum is not within the second threshold range of zero, identifying, by the controller, the fault to have occurred in the collector bus, wherein a protection criterion for the collector bus is determined to be met and the protection criterion for the collector bus is a differential protection criterion;

in response to determining that the injected signal sum is within the second threshold range of zero, identifying, by the controller, the fault to have occurred in a PV collection branch if a direction of the controllable injected signal detected by the collection branch protection relay of that PV collection branch is consistent with a protection reference direction of that collection branch protection relay, wherein a protection criterion of that PV collection branch is determined to be met;

in response to determining that the injected signal sum is within the second threshold range of zero, identifying, by the controller, the fault to have occurred in the delivery line if a direction of the controllable injected signal detected by the delivery line protection relay is consistent with a protection reference direction of the delivery line protection relay, wherein a protection criterion of the delivery line is determined to be met; and transmitting, by the controller, a trigger signal to a disconnector corresponding to the identified fault to isolate the fault and to recover the DC connection system.

* * * * *